US010697575B2

(12) United States Patent
Conrad

(10) Patent No.: US 10,697,575 B2
(45) Date of Patent: Jun. 30, 2020

(54) EXPANSION COMPENSATOR

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 250 days.

(21) Appl. No.: 15/313,921

(22) PCT Filed: Jun. 16, 2015

(86) PCT No.: PCT/CA2015/050555
§ 371 (c)(1),
(2) Date: Nov. 23, 2016

(87) PCT Pub. No.: WO2015/196280
PCT Pub. Date: Dec. 30, 2015

(65) Prior Publication Data
US 2017/0191597 A1 Jul. 6, 2017

(30) Foreign Application Priority Data

Jun. 26, 2014 (CA) ...................................... 2855326
Jul. 25, 2014 (CA) ...................................... 2857811

(51) Int. Cl.
*F16L 51/02* (2006.01)
*F16L 27/111* (2006.01)
*F16L 51/00* (2006.01)

(52) U.S. Cl.
CPC ........... *F16L 51/027* (2013.01); *F16L 27/111* (2013.01); *F16L 51/02* (2013.01); *F16L 51/025* (2013.01); *F16L 51/00* (2013.01)

(58) Field of Classification Search
CPC ......... F16L 51/027; F16L 51/02; F16L 51/00; F16L 27/111; F16L 27/11; F16L 27/107
USPC .......................................... 285/226–229, 419
See application file for complete search history.

(56) References Cited

U.S. PATENT DOCUMENTS

| 337,037 A | 2/1886 | White |
|---|---|---|
| 2,151,911 A | 3/1939 | Green et al. |
| 2,565,296 A | 8/1951 | Chyle |
| 2,645,249 A | 7/1953 | Davis et al. |

(Continued)

FOREIGN PATENT DOCUMENTS

| CA | 2857811 C | 1/2017 |
|---|---|---|
| CN | 2265469 Y | 10/1997 |

(Continued)

OTHER PUBLICATIONS

English translation of CN202171086, as published on Mar. 21, 2012.

(Continued)

*Primary Examiner* — Anna M Momper
*Assistant Examiner* — Fannie C Kee
(74) *Attorney, Agent, or Firm* — Philip C. Mendes da Costa; Bereskin & Parr LLP/S.E.N.C.R.L., s.r.l.

(57) ABSTRACT

An expansion compensator are at least two axially extending elongate members, which combined, circumferentially extend around the expansion compensator while each elongate member individually circumferentially extends only part way around the expansion compensator.

11 Claims, 9 Drawing Sheets

(56) References Cited

U.S. PATENT DOCUMENTS

| | | | |
|---|---|---|---|
| 2,666,657 A * | 1/1954 | Howard | F16L 11/14 |
| | | | 285/226 |
| 3,068,026 A * | 12/1962 | McKamey | F16L 39/005 |
| | | | 285/123.1 |
| 3,183,022 A | 5/1965 | Sayag | |
| 3,235,291 A | 2/1966 | Jacoby | |
| 3,315,704 A | 4/1967 | Shire | |
| 3,372,076 A | 3/1968 | Wilkinson | |
| 3,623,339 A | 11/1971 | Muller | |
| 3,655,224 A | 4/1972 | Carberry et al. | |
| 3,747,367 A | 7/1973 | Muller | |
| 3,807,777 A | 4/1974 | Larkin | |
| 3,866,953 A | 2/1975 | Thastrup | |
| 3,976,312 A | 8/1976 | Murphree | |
| 4,054,158 A | 10/1977 | Hoeman et al. | |
| 4,265,276 A | 5/1981 | Hatada et al. | |
| 4,473,369 A * | 9/1984 | Lueders | A61M 39/1011 |
| | | | 285/419 |
| 4,576,404 A | 3/1986 | Weber | |
| 4,615,543 A * | 10/1986 | Cannon | F16L 35/00 |
| | | | 166/241.4 |
| 4,643,463 A * | 2/1987 | Halling | F16L 27/0857 |
| | | | 285/226 |
| 4,652,475 A | 3/1987 | Haney et al. | |
| 4,683,917 A | 8/1987 | Bartholomew | |
| 4,781,003 A | 11/1988 | Rizza | |
| 4,864,711 A | 9/1989 | Yokota | |
| 5,058,934 A | 10/1991 | Brannon | |
| 5,284,184 A | 2/1994 | Noone et al. | |
| 5,507,319 A | 4/1996 | Kanao | |
| 5,554,426 A | 9/1996 | Röber et al. | |
| 5,850,855 A | 12/1998 | Kerschbaumer et al. | |
| 6,166,143 A | 12/2000 | Watanabe et al. | |
| 6,293,311 B1 | 9/2001 | Bushi et al. | |
| 6,321,794 B1 | 11/2001 | Ishida et al. | |
| 6,386,240 B1 | 5/2002 | Roeber et al. | |
| 6,409,226 B1 | 6/2002 | Slack et al. | |
| 6,412,520 B1 | 7/2002 | Yasumatsu et al. | |
| 6,455,118 B1 | 9/2002 | Dewimille et al. | |
| 6,576,342 B1 | 6/2003 | Cert et al. | |
| 6,581,984 B1 | 6/2003 | Seung-Kyu | |
| 6,631,928 B1 | 10/2003 | Sakata | |
| 6,755,217 B1 | 6/2004 | Yoshida | |
| 6,848,719 B2 | 2/2005 | Rowley | |
| 6,880,861 B2 | 4/2005 | Muroi et al. | |
| 7,143,788 B2 | 12/2006 | Keyes | |
| 7,284,771 B2 | 10/2007 | Baumann et al. | |
| 8,291,943 B2 | 10/2012 | Walle et al. | |
| 2002/0195817 A1* | 12/2002 | Choi | A62C 35/68 |
| | | | 285/45 |
| 2004/0207201 A1 | 10/2004 | Starita | |
| 2004/0256017 A1 | 12/2004 | Ari Ma | |
| 2004/0256018 A1 | 12/2004 | Ikemoto et al. | |
| 2007/0227606 A1 | 10/2007 | Sakazaki | |
| 2008/0210329 A1 | 9/2008 | Quigley et al. | |
| 2009/0076595 A1 | 3/2009 | Lindquist et al. | |
| 2009/0139661 A1 | 6/2009 | Frimel et al. | |
| 2010/0244432 A1 | 9/2010 | Neame et al. | |
| 2011/0259040 A1 | 10/2011 | Cataldo et al. | |
| 2012/0216903 A1 | 8/2012 | Osborne | |
| 2013/0269819 A1 | 10/2013 | Ruby et al. | |
| 2014/0144540 A1 | 5/2014 | Fiolek et al. | |
| 2014/0299218 A1 | 10/2014 | Hirth et al. | |

FOREIGN PATENT DOCUMENTS

| | | |
|---|---|---|
| CN | 101089446 A | 12/2007 |
| CN | 202171086 | 3/2012 |
| CN | 202171086 U | 3/2012 |
| DE | 3123625 A1 | 1/1983 |
| EP | 0789137 A2 | 8/1997 |
| EP | 1002982 A2 | 5/2000 |
| EP | 1010930 | 6/2000 |
| EP | 1010930 A1 | 6/2000 |
| EP | 0789137 A2 | 1/2002 |
| GB | 837559 | 6/1960 |
| WO | 97/18408 | 5/1997 |
| WO | 03/100311 A2 | 12/2003 |
| WO | 03100311 A2 | 12/2003 |
| WO | 2012/078842 A1 | 6/2012 |
| WO | 2013/135244 A1 | 9/2013 |
| WO | 2013/137745 A1 | 9/2013 |

OTHER PUBLICATIONS

English translation of CN101089446, as published on Dec. 19, 2007.
English translation of DE3123625, as published on Jan. 5, 1983.
English translation of WO03100311, as published on Dec. 4, 2003.
English translation of CN2265469, as published on Oct. 22, 1997.
English translation of EP1010930, as published on Jun. 21, 2000.
English translation of EP789137, as published on Jan. 16, 2002.
Abstract, Journal of Materials Processing Technology; "Superplasting forming of bellows expansion joints made of titanium alloys", vol. 178, Issues 1-3, Sep. 14, 2006, pp. 24-28.
The International Search Report and Written Opinion, as received in connection to international patent application No. PCT/CA2015/000161, dated Jun. 19, 2015.
The International Search Report and Written Opinion, as received in connection to international patent application No. PCT/CA2015/050555, dated Jul. 31, 2015.
The Office Action which issued in connection to corresponding OEE Canadian Patent No. 2,587,811, dated.
The Notice of Allowance which was received in connection to corresponding OEE Canadian U.S. Patent No. 2,587,811, dated Nov. 2, 2016.

* cited by examiner

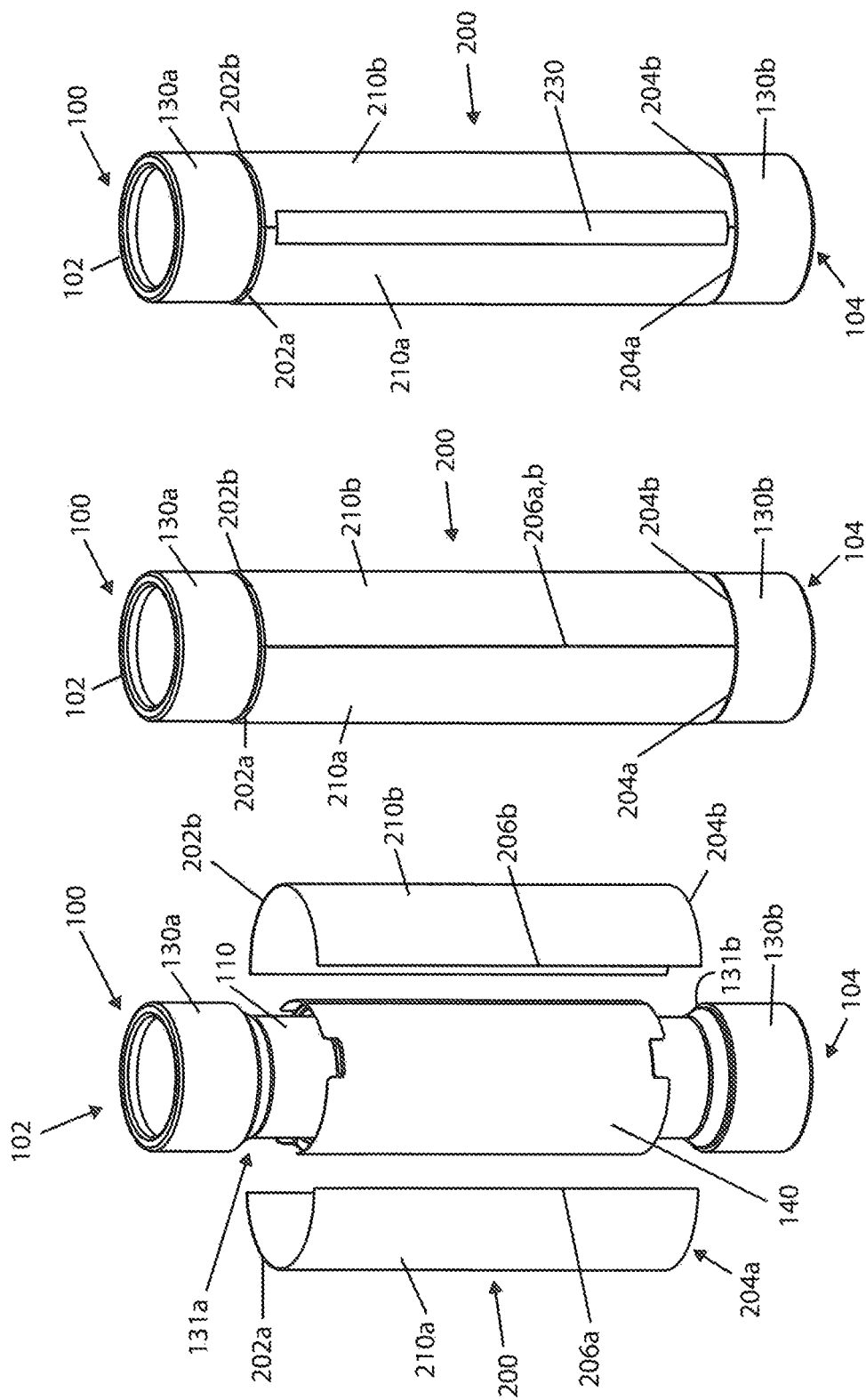

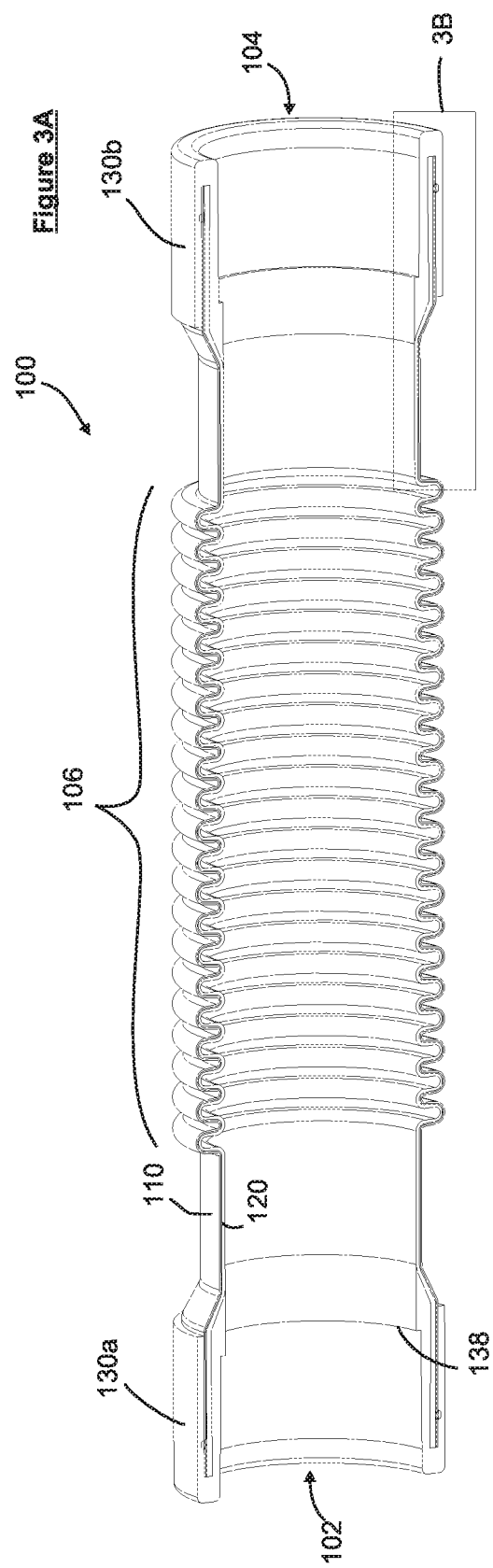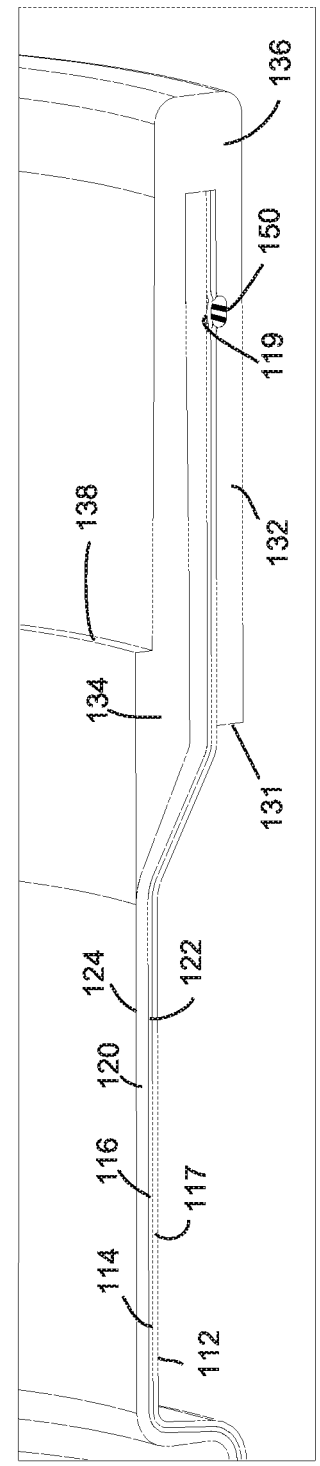

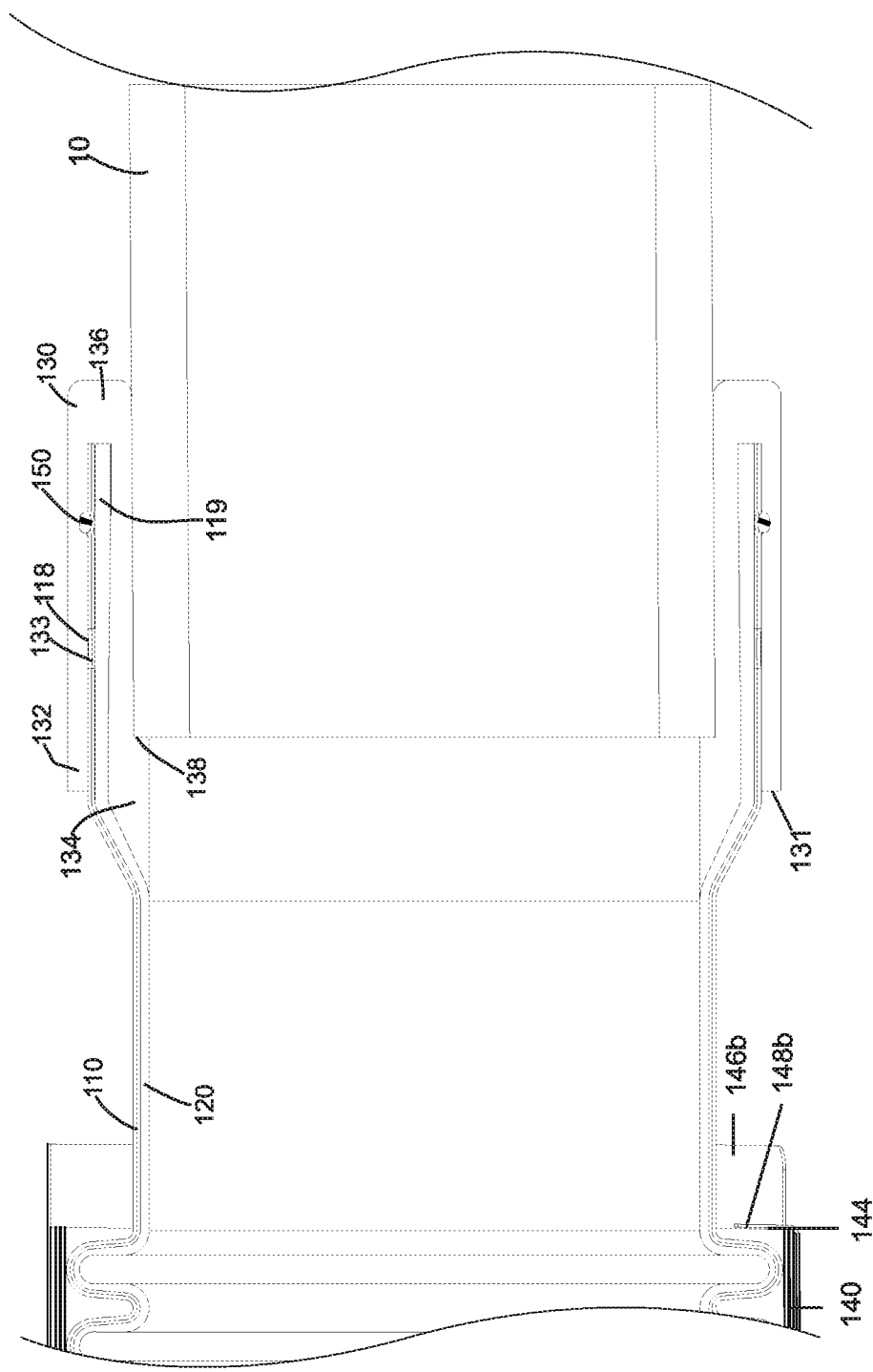

EXPANSION COMPENSATOR

CROSS REFERENCE TO RELATED APPLICATIONS

This application claims benefit of 35 U.S.C. 371 based on co-pending international application No. PCT/CA2015/050555, filed Jun. 16, 2015, which itself claims priority from Canadian patent application 2,855,326 filed on Jun. 26, 2014 and Canadian patent application 2,857,811 filed on Jul. 25, 2014.

FIELD

This disclosure relates generally to an expansion compensator for connecting pipes and fittings that are used to convey a fluid, and more specifically to a method of installing an expansion compensator.

INTRODUCTION

Piping systems are used to convey liquids and/or gasses within, or between, residential, commercial, and/or industrial buildings. For example, most residential buildings have a potable water distribution system for providing cold and/or hot water at one or more locations within the building (e.g. sinks, showers, dish or clothes washing machines).

Typically, piping systems are made up of a number of components including straight or curved pipe sections, fittings (e.g. elbow fittings), valves, etc. to provide an interior flow path for the liquid being conveyed. Typically, a piping system (such as a system comprising thermoplastic pipes), is assembled such that the components are joined in a manner that provides a durable connection that prevents or inhibits the components from separating or cracking due to mechanical, thermal, and/or hydraulic stresses applied to the piping system. Separation of any of the components of the piping system or cracking of any element of the piping system may permit fluid to leak out of the piping system and, e.g., thereby damage the surrounding structure, e.g., the walls of a building which enclose the piping system.

Thermoplastic pipes (such as polyvinyl chloride (PVC) and/or chlorinated polyvinyl chloride (CPVC) pipes) may be subject to thermal expansion and/or contraction after installation. For example, a length of a thermoplastic pipe used for conveying fluid at an elevated temperature (e.g. hot water) may be subject to axial expansion and/or contraction based on the relative temperature of the fluid being conveyed, and the ends of the pipe may exert an axial force (either compressive or tensile) on the fittings, valves, or other parts of the piping system to which they are connected. Typically, hot water usage is intermittent. Therefore, hot water may be conveyed through a pipe for a period of time thereby heating the pipe. Subsequently, the flow of water will be terminated and the water in the pipe will cool as heat is dissipated to the ambient surrounding structure. This heating and cooling will cause the pipe to expand and contract axially. This cycle may be repeated several times a day or an hour. Continued thermal cycling of thermoplastic pipes (e.g., PVC and/or CPVC pipes) can result in a failure of the piping system and result in a leak.

Further, in a high rise building, plastic pipes that are mounted vertically to transport water between floors are mechanically constrained in their mechanical positions due to their mechanical attachment to transversely mounted pipes that deliver water horizontally to the various rooms or locations on the floors of the building. As such, when plastic pipes such as those made of PVC and CPVC are heated by the water that they transport, significant forces are created within the walls of the pipe due to the thermal expansion. These forces may exceed the buckling strength of the pipes, especially for pipe diameters under 6 inches, which may cause the plastic pipes to bend and/or buckle. This stress may result in a leak.

Once an installation is complete (e.g., the interior walls of a building are finished or a piping system is buried under a road), accessing the piping system to repair a leak is typically time consuming and expensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

An expansion compensator may expand and/or contract in response to an applied axial force (compressive or tensile) that may arise from expansion and/or contraction of one or more lengths of pipe. For example, one or more such expansion compensators can be installed between a length of pipe and a fitting so that the axial forces that may be imposed on the pipe and/or the fitting due to thermal expansion and/or contraction of the length of pipe may be reduced. These axial forces may be borne by, or primarily borne by, or substantially borne by the expansion compensator and not by the pipe and/or the fitting. In the case in a high rise building (as compared to a house), each portion of the piping system that conveys hot water to each floor will be subjected to thermal expansion and contraction cycling. Without the use of an expansion compensator, the total expansion which may occur in the piping system carrying hot water to the top floor will be the aggregate of the expansion occurring for each floor of vertical rise, which may prevent the use of plastic piping.

Various types of expansion compensators may be used. Generally, an expansion compensator has at least a portion which may expand and contract as loads are applied thereto, such as loads due to thermal cycling from transporting a fluid. It will be appreciated that more than one portion may be provided that may expand and contract. For example, an expansion/contraction section may be provided at each end of an expansion compensator. Alternatively, the expansion/contraction section may extend along all or substantially all of the expansion compensator. An expansion compensator suitable for use with a plastic piping system may comprise an outer metal conduit and an inner plastic liner that are secured together.

In one embodiment, an expansion compensator suitable for use with a plastic piping system may comprise an outer metal conduit and an inner plastic liner wherein the inner plastic liner is secured to the outer metal conduit such that the outer metal conduit supports the inner plastic liner and absorbs stresses imposed on the inner plastic liner due to thermal cycling of the piping system. At least one, and preferably each end of the outer metal conduit and the inner plastic liner may be provided with a connector that may secure the outer metal conduit and the inner plastic liner together to provide a unitary body (i.e., so that together the outer metal conduit and the inner plastic liner act as a single body). The connector(s) may be provided by being overmolded over the end(s) of the outer metal conduit and the inner plastic liner.

In another embodiment, an expansion compensator suitable for use with a plastic piping system may comprise an outer metal conduit and an inner plastic liner wherein the outer metal conduit and the inner plastic liner may be secured together and wherein the axial stiffness of the metal conduit is greater than the axial stiffness of the inner plastic liner so that the outer metal conduit absorbs more (optionally a substantial portion or essentially all) of stresses imposed on the expansion compensator due to thermal cycling of the piping system. Accordingly, while axial forces imposed by a piping system may be borne by, or primarily borne by, or substantially borne by the expansion compensator, these axial forces may, in turn, be preferentially borne by (e.g., borne by, or primarily borne by, or substantially borne by) the outer metal conduit.

In one or both of these embodiments, the outer metal conduit and the inner plastic liner may be secured together such that fluid flowing in the piping system is not exposed to the outer metal conduit (e.g., the inner plastic liner defines the outer wall of the flow path through the expansion compensator from a pipe or fitting connected at one end of the expansion compensator to a pipe or fitting connected at the other end of the expansion compensator).

An advantage is that the fluid in the piping system is exposed only to the inner plastic liner. Accordingly, the outer metal conduit will not be exposed to the fluid, e.g., water, which may cause the metal to corrode over time. At the same time, the inner plastic liner is reinforced or supported by the outer metal conduit thereby reducing the stress imposed on the inner plastic liner and reducing the likelihood of the inner plastic liner cracking thereby resulting in a leak.

Another advantage is that by utilizing a metal conduit to reinforce the inner plastic liner, the expansion/contraction section (e.g., a bellows or accordion section) of the inner plastic liner may be made of a thinner material which increases the flexibility of the inner plastic liner and reduces the likelihood of the inner plastic liner cracking over time due to expansion and contraction caused by thermal cycling. In particular, since the inner plastic liner is reinforced or supported by the outer metal conduit, the axial forces imposed on the expansion compensator are preferentially absorbed by the outer metal conduit and the stress imposed on the inner plastic liner is reduced, which reduces the likelihood of the inner plastic liner cracking thereby resulting in a leak.

The pipe may be made of a plastic material known in the piping arts. The plastic material may be a thermoplastic material and may be one or more of acrylonitrile butadiene styrene (ABS), PVC, CPVC, ethylene vinyl acetate (EVA), polyethylene (PE), and the like. Preferred materials comprise PVC and/or CPVC.

An advantage of using such expansion compensators is that plastic piping may be used in installations requiring a long run of piping, such as in a high rise building. By providing one or more expansion compensators that will expand or contract in length due to thermal heating and cooling of the piping system, each fitting, e.g., a T-junction, may remain essentially static thereby increasing the reliability of the piping system and reducing the likelihood of a leak occurring.

Connectors that are compatible with typical thermoplastic piping system components (e.g., pipe ends; fittings such as valves, tees, couplers, elbows, and the like) may be provided at each end of the expansion compensator to facilitate its installation. For example, the connectors may be configured to accept typical pipe end dimensions, and for joining and/or sealing using typical means. Also, the expansion compensator may have an inner plastic liner made from the same (or similar) plastic material of the pipes to which it is to be installed, so that a fluid flowing through a pipe and expansion compensator will be in contact with the same (or similar) material through both components.

A piping system may be installed at a temperature of approximately 20° C. (e.g. at room temperature). In piping systems used for conveying fluid at an elevated temperature (e.g. hot water), the amount of thermal expansion of the pipes will depend at least in part on the difference between the installation temperature and the temperature of the conveyed fluid. For example, for a pipe installed at about 20° C. and used to convey hot water in a residential building (which is typically at a temperature of 70° C. to 83° C.), the degree of thermal expansion will be based on a temperature difference of approximately 50° C. to 63° C. Thus, an expansion compensator may be designed based on the expected compressive and tensile loads to be exerted (or imposed) due to thermal expansion or contraction based on such an expected temperature difference. However, if the piping is installed at a lower temperature due to, for example, the environmental temperature at the time of year the piping system is installed (e.g. during winter in a northern climate), the degree of thermal expansion will be based on a larger temperature difference (e.g. the thermal expansion of a pipe installed at about 0° C. and used to convey fluid at a temperature of 70° C. to 83° C. will be based on a temperature difference of approximately 70° C. to 83° C.). The resulting thermal expansion of the pipe may be larger than the expansion compensator and/or piping system was designed to accommodate.

Further, an expansion compensator will itself contract in lower temperatures. Put another way, at low temperatures an expansion compensator may be in a somewhat compressed state. Thus, an expansion compensator installed at low temperatures may have a reduced amount of travel (i.e. the amount the expansion/contraction section is able to compress may be lower) than if the expansion had been installed at a higher temperature. Once the piping system is operating, the expansion compensator will not be able to fully compress within its design specifications when a hot fluid flows through the piping system, which may compromise the operation of the expansion compensator Also, while such an expansion compensator may be designed based on the forces expected to be imposed once the expansion compensator has been installed in a piping system (e.g. the expected compressive and tensile loads to be exerted (or imposed) due to thermal expansion or contraction of components of the piping system), an expansion compensator may also be subject to compressive and/or tensile loads during its installation in a piping system. For example, if a vertical section of pipe is installed in a multi-floor building, the weight of the vertically stacked pipes will apply a downward force to pipes and expansion compensators that are positioned lower in the vertical run. As a vertical run is installed, the pipes may be secured in position, such as by clamps or by horizontal runs of pipes (e.g., extending laterally from a T junction). Once installed, these securement members may absorb a sufficient amount of the weight of the piping system to prevent the upper portion of a piping system from compressing the expansion/contraction section(s) of an expansion compensator installed in the lower portion. However, until such securement members are installed, the weight of portions of a piping system installed above an expansion compensator may be sufficient to partially or fully compress the expansion/contraction section(s) of the expansion compensator.

Therefore, when the securement members are installed, the expansion/contraction section(s) of the expansion compensator will be fixed in a compressed position. Once the piping system is operating, the expansion compensator will not be able to fully compress within its design specifications when a hot fluid flows through the piping system, which may compromise the operation of the expansion compensator.

In addition, when coupling an end of an expansion compensator to a piping system using an insertion fit, an expansion compensator may be subject to higher compressive forces than would be expected due to thermal expansion or contraction. The application of loads in excess of a maximum rated load of an expansion compensator may damage the expansion compensator.

The possible damage to an expansion compensator as a result of the imposition of excessive loads during installation may present a number of challenges. For instance, damage to an expansion compensator during installation may not be apparent to a visual (or other) inspection of the installed expansion compensator. For example, the application of excessive installation loads may crack or otherwise damage the inner plastic liner without damaging the metal conduit, and it may be impractical to inspect the inner plastic liner once the expansion compensator has been installed in a piping system.

To prevent damage resulting from excessive installation loads, and/or to prevent an expansion compensator from being installed in a compressed position (e.g. due to being installed at a relatively low temperature, or due to the weight of portions of a piping system installed above an expansion compensator), an expansion compensator may be provided with an installation guard that inhibits or prevents axial compression of the expansion/contraction section of the expansion compensator during installation. After the expansion compensator has been installed in the piping system, the installation guard may be adjusted—e.g., such as by removing part or all of the guard, permitting portions of the guard to telescope or compress, or the like—to permit the designed axial compression of the expansion/contraction section to occur during operation of the piping system.

In accordance with this broad aspect, there is provided a method for installing an expansion compensator, the expansion compensator having a longitudinal axis and comprising first and second spaced apart ends, an expansion/contraction section located between the first and second spaced apart ends, a first connector provided at the first end, a second connector provided at the second end, and an installation guard operable to inhibit axial compression of the expansion/contraction section, the method comprising:
(a) coupling the first connector and the second connector to a piping system; and
(b) after the first connector and the second connector have been coupled to the piping system, adjusting the installation guard to permit axial compression of the expansion/contraction section during operation of the piping system.

In some embodiments, the installation guard is positioned exterior to the expansion/contraction section, the installation guard comprises a first end that abuts the first connector and a second axially spaced apart end that abuts the second connector, and step (b) comprises removing at least one of the first and second ends from abutment with its respective connector.

In some embodiments, step (b) comprises removing the installation guard from the expansion/contraction section.

In some embodiments, each of the expansion/contraction section and the installation guard have an axial stiffness, wherein during step (a) the axial stiffness of the installation guard is greater than the axial stiffness of the expansion/contraction section, and step (b) comprises modifying the installation guard to have an axial stiffness that is less than the axial stiffness of the expansion/contraction section.

In some embodiments, the installation guard is modified by removing material from the installation guard.

In some embodiments, the installation guard is modified by deforming the installation guard.

In some embodiments, the installation guard comprises at least two installation guard portions that are separable from each other and step (b) comprises removing at least one of the installation guard portions.

In some embodiments, the installation guard comprises at least two axially extending installation guard portions that are separable from each other, at least one of the installation guard portions comprises a first end that abuts the first connector and at least one of the installation guard portions comprises a second axially spaced apart end that abuts the second connector, and step (b) comprises removing at least one of the installation guard portions from abutment with one of the first and second connectors.

In some embodiments, the installation guard portions are secured to each other using a removable adhesive and step (b) comprises removing the adhesive whereby at least one of the installation guard portions is removed from abutment with one of the first and second connectors.

In some embodiments, the expansion compensator comprises a sleeve configured to inhibit lateral movement of the expansion/contraction section during use, the installation guard comprises a first installation guard portion configured to abut the first connector, a second installation guard portion configured to abut the second connector, and the sleeve is positioned intermediate the first and second installation guard portions and step (b) comprises removing at least one of the installation guard portions.

In some embodiments, step (a) comprises coupling the first connector and the second connector to a vertical section of the piping system.

In some embodiments, the expansion compensator may have a first coefficient of thermal expansion along the longitudinal axis, the installation guard may have a second, lower coefficient of thermal expansion along the longitudinal axis and the method may further comprise positioning the installation guard on the expansion compensator to inhibit axial compression of the expansion/contraction section due to thermal contraction of the expansion compensator.

In some embodiments, the expansion compensator may have a first coefficient of thermal expansion along the longitudinal axis, the installation guard may have a second, lower coefficient of thermal expansion along the longitudinal axis and the installation guard may be installed on the expansion compensator at a first temperature, and step (a) is conducted at a second temperature below the first temperature. The first temperature may be from about 15° C. to about 25° C., and the second temperature may be less than about 5° C.

In accordance with another broad aspect, there is provided an expansion compensator connectable in a piping system, the expansion compensator comprising:
(a) an elongate conduit having first and second spaced apart ends, an inner surface, an outer surface, and an expansion/contraction section and an interior volume extending from the first end to the second end;

(c) a first connector provided at the first end of the elongate conduit, the first connector having an opening in fluid communication with the interior volume of the inner plastic liner;

(d) a second connector provided at the second end of the elongate conduit, the second connector having an opening in fluid communication with the interior volume of the inner plastic liner; and, (e) an installation guard operable to inhibit axial compression of the expansion/contraction section during installation.

In some embodiments, the installation guard is removably mounted to the expansion compensator.

In some embodiments, the installation guard is positioned exterior to the expansion/contraction section, the installation guard comprising a first end that abuts the first connector and a second axially spaced apart end that abuts the second connector.

In some embodiments, the installation guard is configured to be deformed following installation to enable compression of the expansion/contraction section during use of the piping system.

In some embodiments, at least a portion of the installation guard is removable from the expansion/contraction section.

In some embodiments, the installation guard comprises at least two discrete installation guard portions and at least one of the installation guard portions is removable from the expansion/contraction section.

In some embodiments, the installation guard portions are removably secured to each other.

In some embodiments, the installation guard portions are removably secured to each other using tape.

In some embodiments, the installation guard is made of cellulose.

In some embodiments, the expansion/contraction section may have a first coefficient of thermal expansion along the longitudinal axis, the installation guard may have a second, lower coefficient of thermal expansion along the longitudinal axis and the installation guard may be operable to inhibit axial compression of the expansion/contraction section due to thermal contraction of the expansion compensator.

In some embodiments, the installation guard also comprises a thermal compression guard.

In accordance with another broad aspect, there is provided an expansion compensator connectable in a piping system, the expansion compensator comprising:

(a) an elongate conduit having first and second spaced apart ends, an inner surface, an outer surface, and an expansion/contraction section and an interior volume extending from the first end to the second end;

(c) a first connector provided at the first end of the elongate conduit, the first connector having an opening in fluid communication with the interior volume of the inner plastic liner;

(d) a second connector provided at the second end of the elongate conduit, the second connector having an opening in fluid communication with the interior volume of the inner plastic liner; and, (e) a thermal compression guard having a second, lower coefficient of thermal expansion operable to inhibit axial compression of the expansion/contraction section due to thermal contraction of the expansion compensator.

In some embodiments, the thermal compression guard may be mounted to the expansion compensator so as to inhibit thermal contraction of at least a portion of the expansion/contraction section when the expansion/contraction section is exposed to temperatures below room temperature.

In some embodiments, the thermal compression guard may be mounted to the expansion compensator so as to inhibit thermal contraction of the expansion/contraction section when the expansion/contraction section is exposed to temperatures below room temperature.

In some embodiments, the thermal compression guard may comprise a first end that abuts the first connector and a second axially spaced apart end that abuts the second connector.

In some embodiments, at least a portion of the thermal compression guard may be removable from the expansion/contraction section.

In some embodiments, the installation guard may comprise at least two discrete thermal compression guard portions and at least one of the thermal compression guard portions may be removable from the expansion/contraction section.

In some embodiments, the thermal compression guard portions may be removably secured to each other.

In some embodiments, the thermal compression guard portions may be removably secured to each other using tape.

In some embodiments, the thermal compression guard may be made of cellulose.

In some embodiments, the thermal compression guard may also comprise an installation guard operable to inhibit axial compression of the expansion/contraction section during installation.

In another aspect, an expansion compensator may be provided with an increased ability to absorb compressive forces be stretching the expansion compensator (the expansion/contraction or bellows section) prior to installing a guard. Accordingly, the expansion/contraction section will be able to contract a greater amount once the guard is removed.

In accordance with this aspect, there is provided an expansion compensator connectable in a piping system, the expansion compensator comprising:

(a) an elongate conduit having first and second spaced apart ends and an expansion/contraction section, the expansion/contraction section being reconfigurable between a neutral configuration and a stretched configuration;

(c) a first connector provided at the first end of the elongate conduit, the first connector having an opening in fluid communication with an interior volume of the elongate conduit;

(d) a second connector provided at the second end of the elongate conduit, the second connector having an opening in fluid communication with an interior volume of the elongate conduit; and, (e) a guard positioned to maintain the expansion/contraction section in the stretched configuration.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The apparatus and methods described herein may be used to connect pipes and/or fittings of various materials (e.g. metallic pipes, thermoplastic pipes) to create piping systems for transporting various liquids or gasses. It will be appreciated that the piping system that uses the expansion compensator may be made from different materials (e.g., the pipes may be made of PVC and/or CPVC and the fittings may be made of metal). Alternatively, the piping system components (or at least their inner surfaces through which fluid is conveyed) may be made of the same material.

Furthermore, the apparatus and methods may be applied to different sizes of piping, and/or piping systems made of the same or different materials, and therefore may be applicable to piping systems for domestic or commercial uses, such as conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which:

FIG. 1A is a perspective view of an expansion compensator with an installation guard positioned for installation in accordance with one embodiment;

FIG. 1B is a perspective view of the expansion compensator and installation guard of FIG. 1A with the installation guard positioned to inhibit axial compression of an expansion/contraction section of the expansion compensator;

FIG. 1C is a perspective view of the expansion compensator and installation guard of FIG. 1B with the installation guard portions removably secured to each other using tape;

FIG. 3A is a cross section view of an expansion compensator in accordance with one embodiment;

FIG. 3B is an enlarged view of the box 3B in FIG. 3A of the expansion compensator of FIG. 3A;

FIG. 4 is a cross section view of an end of the expansion compensator of FIG. 3A joined to a pipe end;

Figure 2A:
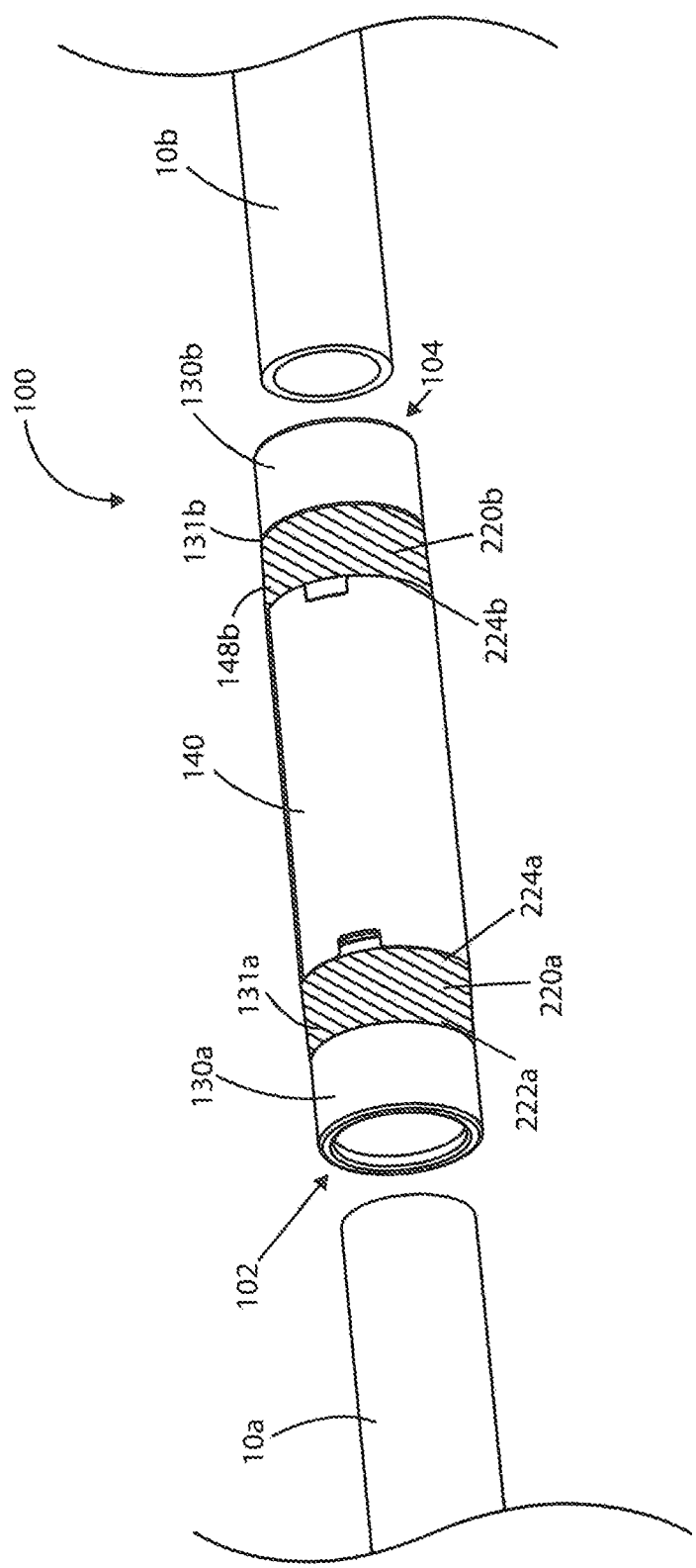
FIG. 2A is a perspective view of an expansion compensator, which has a pair of installation guards, disposed between two pipe ends.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The pipes and/or fittings to be connected may be made of a plastic material and optionally a thermoplastic material. The thermoplastic material may be one or more of acrylonitrile butadiene styrene (ABS), PVC, CPVC, ethylene vinyl acetate (EVA), polyethylene (PE) or the like. Preferably, the thermoplastic material is one or more of PVC and CPVC.

The drawings exemplify the use of the expansion compensator to connect sections of pipe together. It will be appreciated that the same expansion compensator may be used to connect any parts of a piping system together. For example, the expansion compensator may be used to connect a pipe with a fitting such as a valve, tees, couplers, elbows and the like, or to connect one fitting with another fitting.

FIGS. 3A to 5B exemplify different embodiments of an expansion compensator 100, each of which may be installed according to the methods disclosed herein. An expansion compensator 100 may include an elongate metal conduit, referred to generally as 110, interior to which is positioned an inner plastic liner 120 that provides a fluid flow path through the expansion compensator 100. Also, first and second connectors 130a,b may be provided at opposite ends of the metal conduit and plastic liner. Connectors 130a,b may be used for coupling the expansion compensator to a piping system, as will be discussed further subsequently.

Methods for manufacturing expansion compensator 100 are described in Canadian patent applications 2,847,520 and 2,847,536 filed on Mar. 25, 2014, the disclosure of which is incorporated herein by reference. Constructions of expansion compensators are described in Canadian patent applications 2,846,801 filed on Mar. 17, 2014 and U.S. Pat. No. 2,846,921 filed on Mar. 18, 2014, the disclosure of which is incorporated herein by reference.

As exemplified in FIG. 3A, expansion compensator 100 comprises a first end 102, a second end 104, and an expansion/contraction section 106. Expansion/contraction section 106 allows for the axial length of expansion compensator 100 to vary in response to an applied axial force (either compressive or tensile). For example, if the position of first end 102 is fixed, and an axial force is applied to second end 104 in a direction towards first end 102, expansion/contraction section 106 may contract in the axial direction, reducing the axial length of expansion compensator 100. Also, if the position of first end 102 is fixed, and an axial force is applied to second end 104 in a direction away from first end 102, expansion/contraction section 106 may expand in the axial direction, increasing the axial length of expansion compensator 100. While expansion/contraction section 106 is illustrated as a bellows section having a series of convolutions, it will be appreciated that other geometric configurations such as sinusoidal or otherwise articulated surface may be used. These constructions permit the expansion compensator to temporarily deform (e.g., elastically deform) axially inwardly and outwardly during thermal expansion and contraction of the piping system, without fracture of the expansion compensator.

Still referring to FIG. 3A, the main body of expansion compensator 100 comprises elongate metal conduit 110, within which is positioned inner plastic liner 120. Preferably, the opposite ends of metal conduit 110 and inner plastic liner 120 are coupled together to provide a unitary body (i.e., so that the respective ends of the outer metal conduit and the inner plastic liner axial will have the same relative displacement in response to an applied axial force). In such an arrangement, metal conduit 110 and inner plastic liner 120 may be characterized as springs acting in parallel. Thus, the overall axial stiffness of expansion compensator 100 (e.g. $k_{EC}$) may be approximated as the sum of the axial stiffness of metal conduit 110 (e.g. $k_{MC}$) and the axial stiffness of inner plastic liner 120 (e.g. $k_{IPL}$):

$$k_{EC} \cong k_{MC} + k_{IPL} \quad (1)$$

It follows that where the axial stiffness of the elongate metal conduit is greater than the stiffness of the inner plastic liner, a greater portion (preferably a substantial portion, and most preferably substantially all) of an axial force applied to expansion compensator 100 will be borne (e.g. absorbed) by metal conduit 110, while inner plastic liner 120 will bear a smaller portion (preferably a significantly smaller portion) of the applied axial force. Put another way, to balance (e.g. reach equilibrium with) an axial force $F_{EC}$ applied to expansion compensator 100, and assuming a common axial displacement –x (i.e. compression), the magnitude of the force exerted by each of metal conduit 110 ($F_{MC}$) and inner plastic liner 120 ($F_{IPL}$) will be proportional to their respective stiffness:

$$F_{EC} = F_{MC} + F_{IPL} \quad (2)$$
$$= (k_{MC} \cdot -x) + (k_{IPL} \cdot -x)$$
$$= (k_{MC} + k_{IPL})(-x)$$

For example, if the axial stiffness $k_{MC}$ is four times greater than the axial stiffness $k_{IPL}$, metal conduit 110 will provide about 80% of the total force exerted by expansion compensator 100 in response to an applied axial force.

While the stiffer metal conduit 110 may absorb the majority of an applied axial force, inner plastic liner 120 may provide a barrier between the metal conduit and a fluid flowing through expansion compensator 100. For example, inner plastic liner 120 may protect metal conduit 110 from corrosive or otherwise reactive fluids, extending the lifespan of metal conduit 110 and/or preventing portions of metal conduit 110 from leaching into fluids flowing through expansion compensator 100. Preferably, the expansion compensator has an inner plastic liner made from the same (or similar) thermoplastic material of the pipes to which it is to be installed, so that a fluid flowing through a pipe and expansion compensator will be in contact with the same (or similar) material through both components.

Metal conduit 110 may be made from steel, copper, or other iron alloys, or any other metal used in the piping arts although it will be appreciated that other metallic materials may be suitable. Preferably, metal conduit 110 is made from one or more layers of stainless steel, such as SS316L stainless steel.

As exemplified in FIG. 3B, metal conduit 110 comprises an inner elongate metal conduit 116 and an outer elongate metal conduit 117, together with inner plastic liner 120 forming a three-layer expansion compensator. Where metal conduit 110 comprises more than one metal layer, it will be appreciated that the overall axial stiffness of metal conduit 110 may be approximated as the sum of the axial stiffness for each metal layer. In such a case, inner elongate metal conduit 116 and outer elongate metal conduit 117 may have the same stiffness or they may be different. It will also be appreciated that inner elongate metal conduit 116, outer elongate metal conduit 117 and inner plastic liner 120 may be abutting as exemplified in FIG. 3B or they may be spaced apart. In some embodiments, in order to reduce friction a lubricant may be provided between inner elongate metal conduit 116 and inner plastic liner 120.

In embodiments where metal conduit 110 comprises two layers, the thickness of each metal conduit 116,117 may be from 0.005 to 0.025 inches, preferably from 0.008 to 0.020 inches, and more preferably from 0.012 to 0.016 inches.

Alternatively, metal conduit 110 and inner plastic liner 120 may each comprise a single layer, together forming a two-layer expansion compensator. For these embodiments, the thickness of metal conduit 110 may be from 0.005 to 0.050 inches, preferably from 0.010 to 0.020 inches, and more preferably from 0.012 to 0.016 inches. The thickness of inner plastic liner 120 may be from 0.005 to 0.125 inches, preferably from 0.020 to 0.1 inches, and more preferably from 0.040 to 0.090 inches.

It will be appreciated that the stiffness of expansion compensator 100 may vary based on the number of metal layers in metal conduit 110, the particular metal or metals used, the thickness of each metal layer, and/or the geometry of metal conduit 110. The stiffness of expansion compensator 100 may also depend on the number of layers in inner plastic liner 120, the particular plastic or plastics used, the thickness of each plastic layer, and/or the geometry of inner plastic liner 120.

In FIG. 3A, expansion/contraction section 106 is generally illustrated as a bellows section having a series of convolutions. While the expansion/contraction sections of metal conduit 110 and inner plastic liner 120 are shown with complementary profiles (e.g. each have a similar profile, and these profiles are aligned), it will be appreciated that that this need not be the case. For example, metal conduit 110 and inner plastic liner 120 may have different profiles and/or the profiles need not be aligned.

Where inner plastic liner 120 comprises more than one plastic layer, it will be appreciated that the overall axial stiffness of inner plastic liner 120 may be approximated as the sum of the axial stiffness for each plastic layer. In such a case, each plastic layer may have the same stiffness or they may be different. It will also be appreciated that each plastic layer may be abutting or one or more may be spaced apart.

In embodiments where inner plastic liner 120 comprises two layers, the thickness of each plastic layer may be from 0.005 to 0.075 inches, preferably from 0.020 to 0.050 inches, and more preferably from 0.03 to 0.045 inches.

It will be appreciated that metal conduit 110 and inner plastic liner 120 may be abutting as exemplified in FIG. 3B or they may be spaced apart. That is, while outer surface 122 of inner plastic liner 120 is illustrated as being in contact with (e.g. abutting) inner surface 114 of metal conduit 110, it will be appreciated that in some embodiments, an air gap may be present along all or part of the length of expansion compensator 100. In some embodiments, in order to reduce friction a lubricant may be provided between metal conduit 110 and inner plastic liner 120. The lubricant may be any lubricant that is compatible with the inner plastic liner and metal conduit and may be talcum powder, powdered Teflon, powdered mica and the like.

In other embodiments, expansion compensator 100 may comprise additional layers. For example, a protective layer (not shown) may be disposed between metal conduit 110 and inner plastic liner 120. Such a protective layer may serve to reduce friction between metal conduit 110 and inner plastic liner 120 during expansion and/or contraction of expansion compensator 100. Also, such a protective layer may provide an additional 'failsafe' layer to prevent leakage of fluid from within expansion compensator 100 (e.g. should one or more cracks develop in inner plastic liner 120 and/or metal conduit 110).

The protective layer may be located between metal conduit 110 and inner plastic liner 120 and may abut a surface or may be spaced from the facing surfaces. For example, a protective layer may be provided: as a coating on outer surface 122 of inner plastic liner 120; as a coating on inner surface 114 of elongate metal conduit 110; and/or as a separate layer positioned between metal conduit 110 and plastic liner 120 during manufacture of expansion compensator 100.

Preferably, the protective layer is made from polytetrafluoroethylene (PTFE) or one or more other suitable fluoropolymers, although it will be appreciated that other materials may be used.

The elongate metal conduit 110 and the inner plastic liner 120 may be coupled together by providing a connector 130 at one and preferably each end of the expansion compensator. As shown in FIG. 3B, metal conduit 110 (illustrated here as comprising an inner elongate metal conduit 116 and an outer elongate metal conduit 117) has an outer surface 112 and an inner surface 114. Inner surface 114 is adjacent an outer surface 122 of inner plastic liner 120, while inner surface 124 of inner plastic liner 120 defines the interior volume of expansion compensator 100 between connectors 130a,b.

As exemplified in FIG. 3B, each connector 130 is secured to each of metal conduit 110 and inner plastic liner 120 to thereby secure metal conduit 110 and inner plastic liner 120 together. As exemplified, connector 130 may have a first portion or arm 132 secured to the outer surface 112 of elongate metal conduit 110, and a second portion or arm 134 secured to the inner surface 124 of inner plastic layer 120. In the illustrated embodiment, first portion 132 and second portion 134 are connected via an end portion 136, such that connector 130 defines a generally U-shaped cavity between portions 132, 134, and 136.

Also, each connector 130 may have one or more surfaces 131 that generally face towards the other end of expansion compensator 100. While in the illustrated embodiments inwardly-facing surface 131 extends continuously around expansion compensator 100, it will be appreciated that in variant embodiments one or more discontinuous inwardly facing surfaces may be provided on connector 130.

In some embodiments, as shown in FIG. 4, the ends of metal conduit 110 may be provided with a plurality of openings 118. These openings may assist in securing connectors 130a,b to respective ends of expansion compensator 100. Also, engagement of connector 130 and openings 118 in metal conduit 110 may allow a greater portion of an axial force applied to connector 130 to be transferred to metal conduit 110, rather than to inner plastic liner 120.

For example, openings 118 may allow a portion of first portion 132 of connector 130 to project into metal conduit 110, which may provide a more robust connection between metal conduit 110 and connector 130. These connecting portions 133 extending through openings 118 may be provided by, for example, overmolding portions 132, 134, and 136 of connector 130 onto the ends of metal conduit 110 and inner plastic liner 120. An advantage of connecting portions 133 is that connecting portions 133 extend at about 90° to the axial forces that are expected to be exerted on expansion compensator 100 by thermal cycling. Thus, the axial forces that are applied to expansion compensator 100 may be transferred to metal conduit 110 via connectors 130a,b, and not via inner plastic liner 120.

As noted previously, if elongate metal conduit 110 comprises inner elongate metal conduit 116 and outer elongate metal conduit 117, then each metal conduit 116, 117 may be provided with openings 118. Accordingly, even if two metal conduits 116, 117 are used, connecting portions 133 may extend from portion 132 through both metal conduits 116, 117 to be secured to inner plastic liner 120, which itself may be secured to portion 134 of connector 130, such as by heating to form a unitary body, an adhesive or the like.

An advantage of forming connecting portions 133 by overmolding, is that portions 132, 134 of connector 130, connecting portions 133 and inner liner 120 may be formed essentially as a unitary body (e.g., the plastic that is used to overmold will heat inner liner 120 and may melt a sufficient amount of inner liner 120 to be secured thereto). Metal conduit 110 may therefore be embedded therein and securely fixed in position and thereby be adapted to incur axial stresses applied by thermal cycling.

Alternatively, connectors 130 may be formed with projections on the inner surface of first portion 132 sized and located to be received in openings 118 and act as connecting portions 133 when connector 130 is mounted (e.g. press-fit or snapped on to) an end 102, 104 of metal conduit 110. In this latter case, the connecting portions 133 may be secured to inner plastic liner 120 by, e.g., an adhesive, welding or the like. Optionally, inner plastic liner 120 may be secured to portions 134 of connector 130 in a similar manner.

Optionally, the ends of metal conduit 110 may be provided with one or more surface features (e.g. radial ridges or grooves) to facilitate the installation of a gasket between metal conduit 110 and outer portion 132 of connector 130. For example, as shown in FIG. 3B, a radial groove 119 may be provided on outer surface 112 of an end of metal conduit 110, radial groove 119 being configured to receive a gasket such as an O-ring 150. Such a gasket may be provided to minimize the chance of fluid leaking from expansion compensator 100 via, e.g., a gap between inner surface 124 of inner plastic liner 120 and second portion 134 of connector 130, between the ends of metal conduit 110 and inner plastic liner 120 and end portion 136 of connector 130, and between outer surface 112 of metal conduit 110 and first portion 132 of connector 130. Radial groove 119 may assist in locating and retaining O-ring 150 relative to the end of expansion compensator 100 as connector 130 is mounted and/or molded to an end 102, 104 of metal conduit 110. It will be appreciated that a gasket may be provided in the absence of a groove 119.

Accordingly, prior to overmolding (or otherwise providing) one or more connectors 130, one or more gaskets (e.g. O-ring 150) may be installed on the ends of metal conduit 110 (e.g. in one or more grooves 119) prior to overmolding the connectors.

Additionally, or alternatively, the outer surface 112 of metal conduit 110 (and/or the inner surface of inner plastic liner 120) at the ends of expansion compensator 100 may be subject to a surface treatment prior to overmolding, to improve the connection between metal conduit 110 and/or inner plastic liner 120 and connectors 130.

Figure 5A:
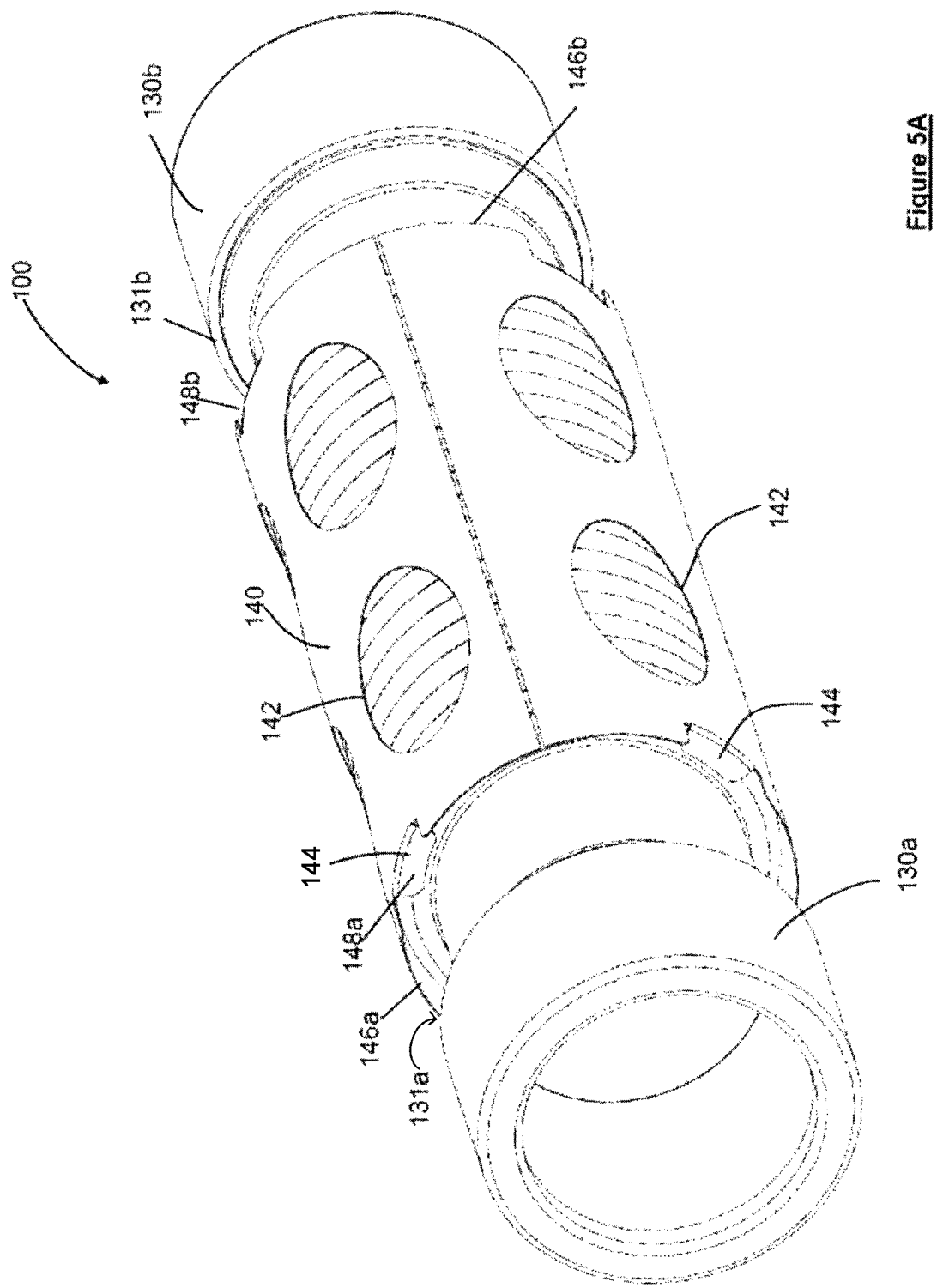
FIG. 5A is a perspective view of an expansion compensator with a sleeve.

As illustrated in FIG. 5A, expansion compensator 100 may be provided with a sleeve 140. Sleeve 140 may overlie some and preferably all or essentially all of expansion/contraction section 106 to protect against damage, restrain deflection of expansion/contraction section 106 in a radial or lateral direction, and/or provide a distinctive aesthetic appearance to expansion compensator 100. For example, expansion/contraction section 106 of expansion compensator 100 may have a corrugated exterior surface. This surface might get caught (which could cause damage to the expansion compensator) as a pipe with the expansion compensator is slid into position. Providing a sleeve 140 over some or all of expansion/contraction section 106 may assist the expansion compensator being placed in position. In addition, when axially loaded, expansion/contraction section 106 of expansion compensator 100 may tend to deflect laterally instead of compress. Sleeve 140 may overlie some or all of expansion compensator 100 so as to inhibit and, preferably, prevent, lateral deflection under axial loading. In such a case, the inner diameter of sleeve 140 is preferably proximate that of the outer diameter of expansion/contraction section 106.

In some embodiments, one or both ends of sleeve 140 may have one or more end surfaces 146 that generally face towards the connector at its respective end of expansion compensator 100. In the example illustrated in FIG. 5A, end surface 146*a* faces inwardly-facing surface 131*a* of connector 130*a*, and end surface 146*b* faces inwardly-facing surface 131*b* of connector 130*b*. While in the illustrated embodiments, a number of discontinuous end surfaces 146 extend around sleeve 140, it will be appreciated that in variant embodiments one or more continuous end surfaces 146 may be provided at one or both ends of sleeve 140.

Sleeve 140 may have one or more tabs 144 or other engagement means to retain it in a preset axial position about expansion compensator 100. The engagement means permit sleeve 140 to be retained in position while still allowing expansion compensator 100 to expand and contract. Accordingly, for example, tabs 144 may be positioned axially outwardly from the axially opposed ends of expansion/contraction section 106 so as to permit expansion/contraction section 106 to expand and contract its entire design distance without restriction. Accordingly, tabs 144 may be spaced sufficiently from the last ridge of expansion/contraction section 106 (i.e. the ridge closest to the connector) such that, when fully expanded the ridge may at most abut tab 144.

Each tab 144 may have one or more surfaces that generally face towards the connector at its respective end of expansion compensator 100. In the example illustrated in FIG. 5A, surface 148*a* faces inwardly-facing surface 131*a* of connector 130*a*, and surface 148*b* faces inwardly-facing surface 131*b* of connector 130*b*.

Figure 5B:
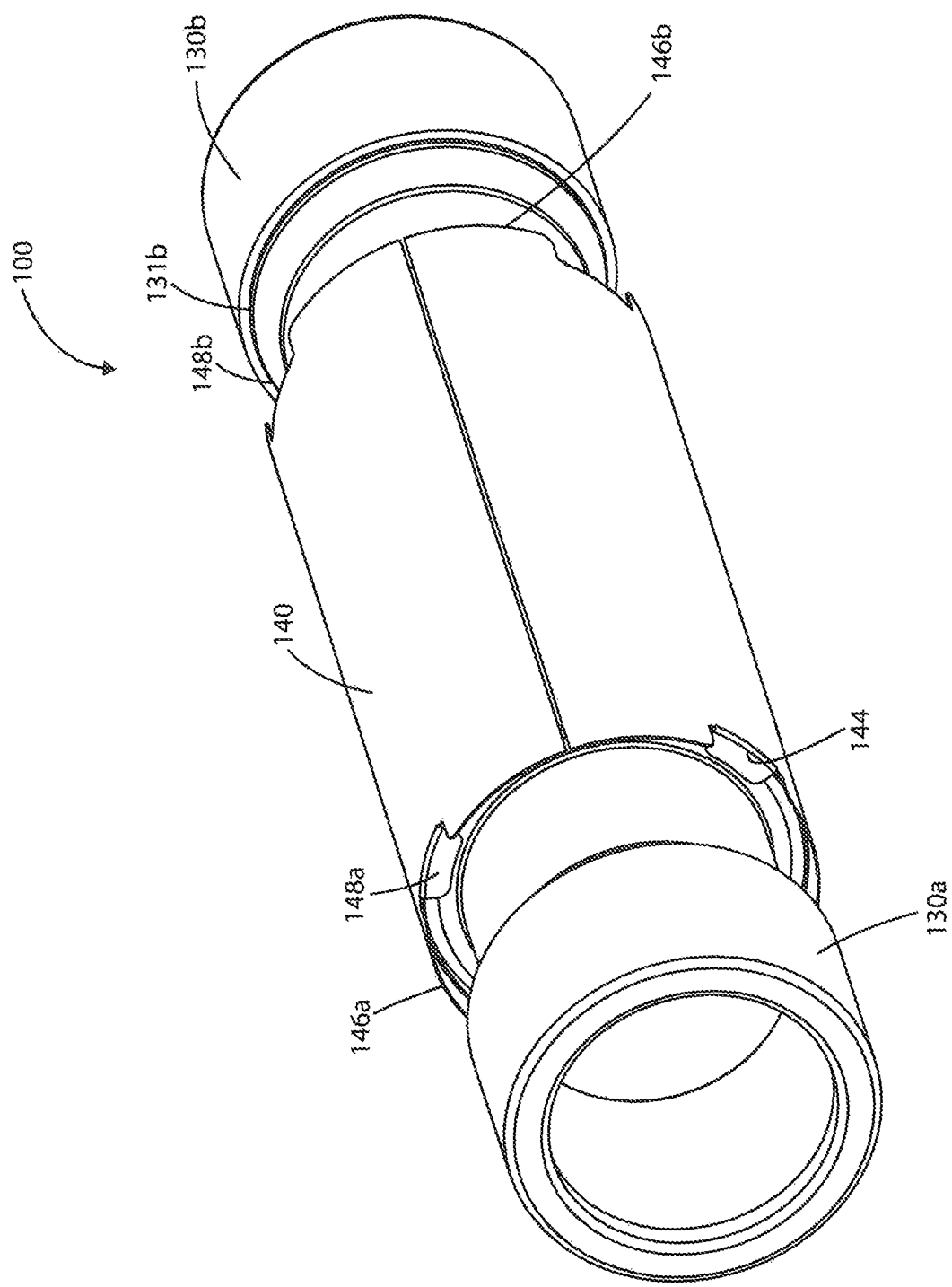
FIG. 5B is a perspective view of the expansion compensator of FIG. 5A with an alternate sleeve.

Sleeve 140 may also have one or more viewing ports 142 to allow for visual inspection of the outer surface 112 of metal conduit 110 in the expansion/contraction section 106. FIG. 5B illustrates an example sleeve 140 without viewing ports 142.

Connectors 130*a,b* may be configured or adapted for coupling expansion compensator 100 to other components of a piping system. For example, connectors 130*a,b* may comprise exterior and/or interior surface features (e.g. threads, grooves, ridges, tabs), and may be dimensioned to receive (and/or be received within) a number of piping system components, such as pipes, fittings, valves, and the like. Also, while connectors 130*a,b* in the illustrated embodiments are substantially similar to each other, it will be appreciated that in alternative embodiments different connectors (e.g. for coupling to different sizes and/or types of components) may be provided on opposite ends of the same expansion compensator.

The apparatus exemplified uses an insertion fit, i.e., one end of one part of a piping system is inserted into an open end of another part of the piping system. For example, connector 130*a,b* may be dimensioned to receive first and second pipe ends inserted into first end 102 and second end 104, respectively, of expansion compensator 100. Connector 130 may be configured such that an end of a pipe may be inserted only up to a predetermined distance into connector 130. This may assist in aligning one or more features (e.g. injection passages, grooves) of the connector and/or the pipe end with each other. Therefore, a stop member may be provided inside connector 130. For example, as exemplified in FIG. 3B, in some embodiments one or both connectors 130*a,b* may comprise an interior ridge 138 that provides an abutment surface against which a pipe end inserted into the respective connector 130*a,b* will abut when inserted a predetermined distance, to assist in coupling expansion compensator 100 to a pipe end, as shown in FIG. 4. It will be appreciated that interior ridge 138 may have a height that is similar to or the same as the thickness of the pipe inserted into end 104. Accordingly, the cross sectional area of flow through the pipe and the end of the expansion compensator is generally the same.

Figure 2B:
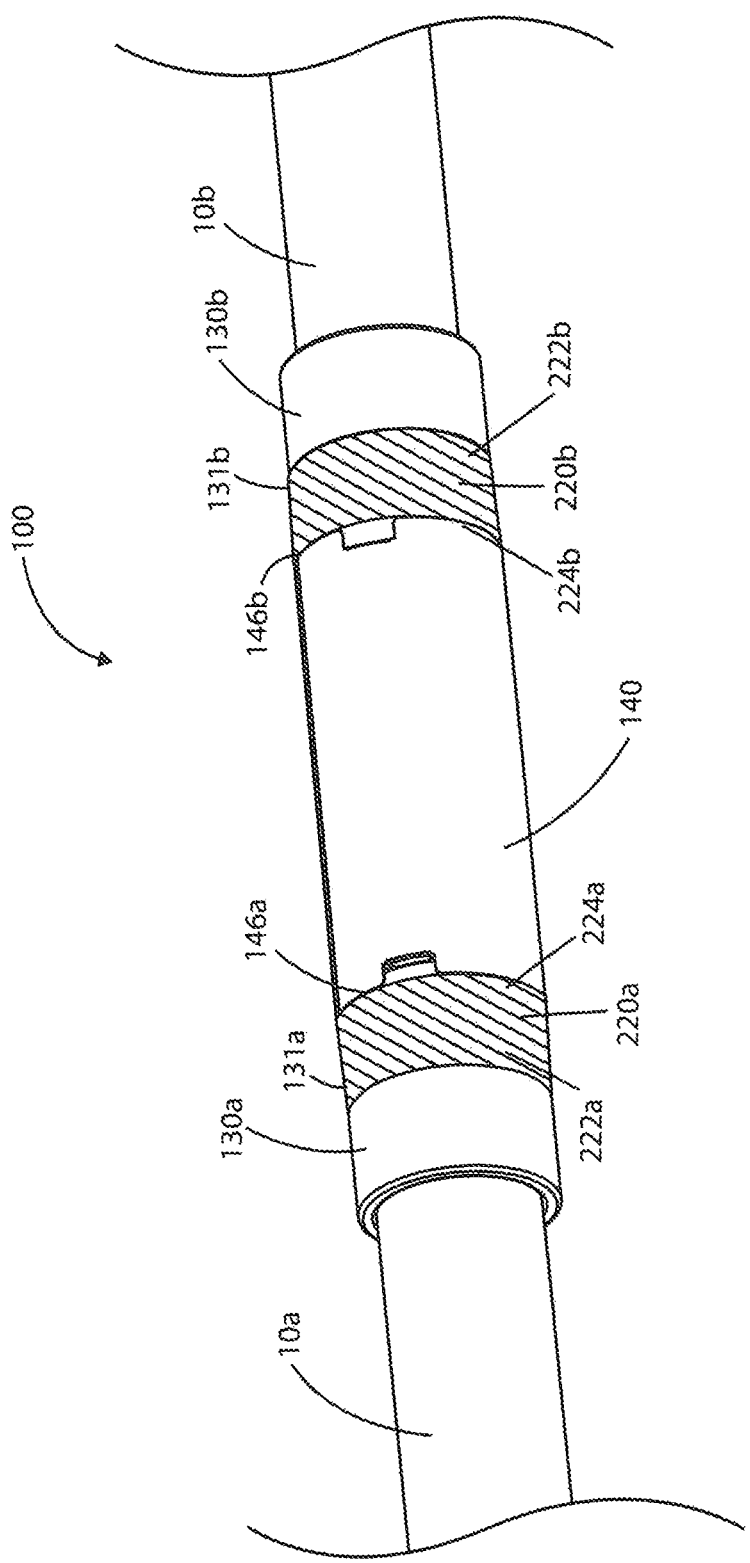
FIG. 2B is a perspective view of the expansion compensator, installation guards, and pipe ends of FIG. 2A with the pipe ends received in the connectors of the expansion compensator.
Figure 2C:
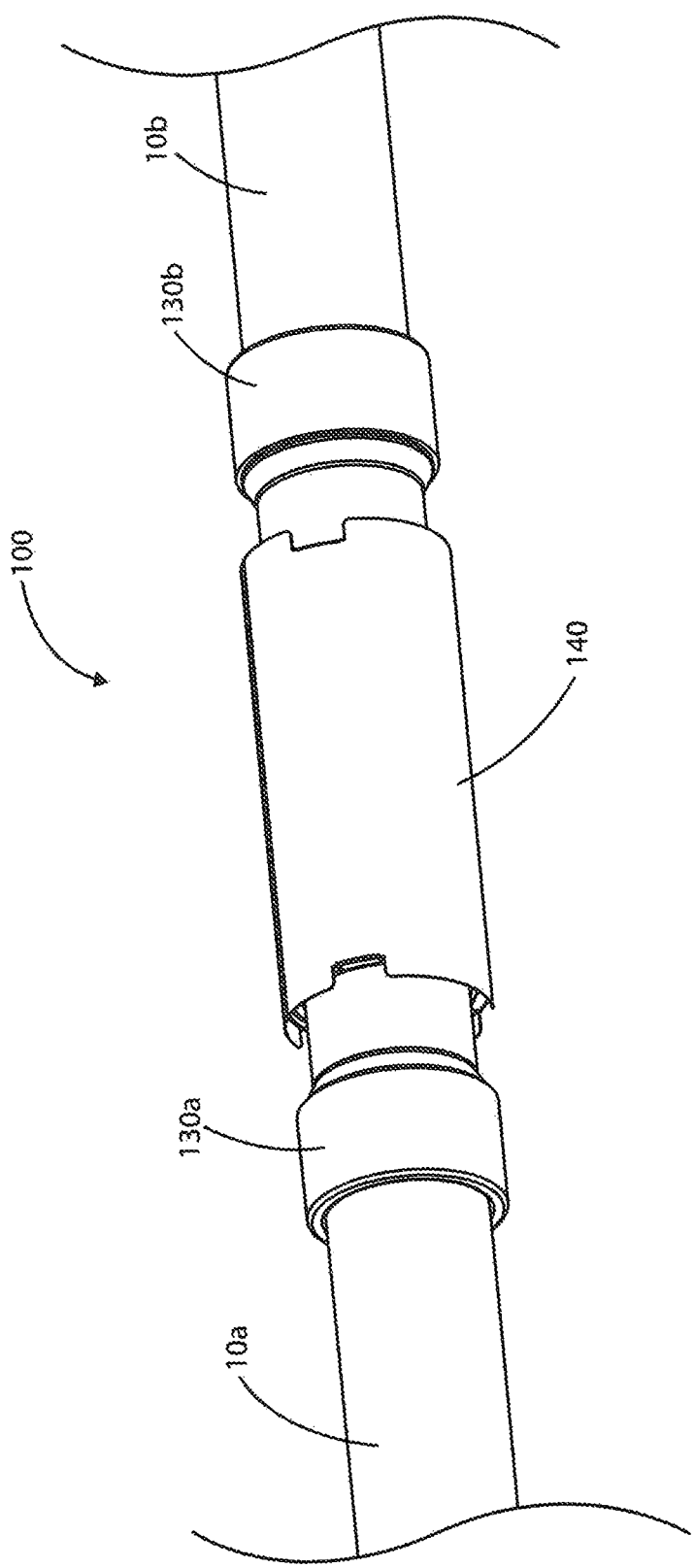
FIG. 2C is a perspective view of the expansion compensator of FIG. 2A with the pipe ends received in the connectors of the expansion compensator and the installation guards removed so as to reveal a sleeve.
Figure 2D:
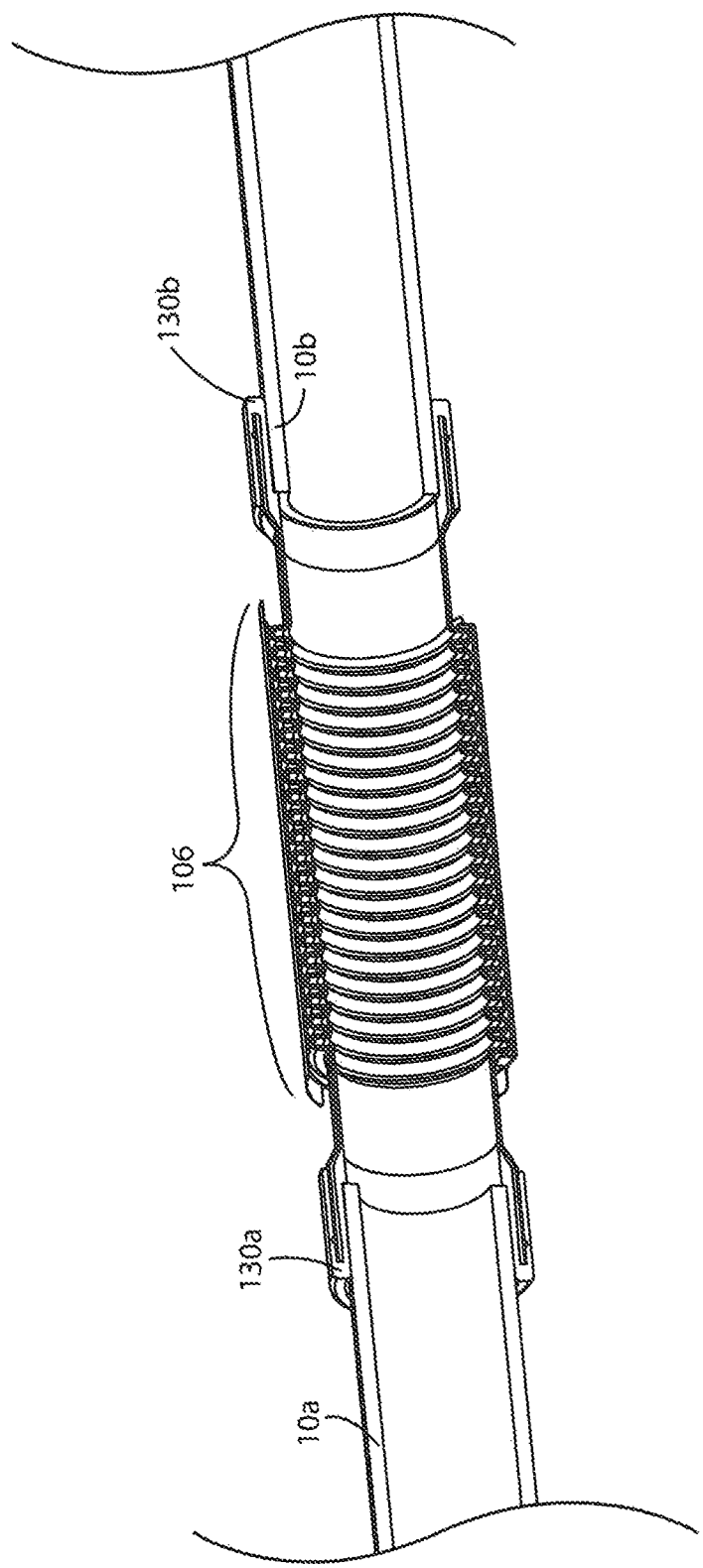
FIG. 2D is a longitudinal cross section view of FIG. 2C.

FIG. 2D exemplifies a cross section view of expansion compensator 100 coupled to pipe ends 10*a,b*. Expansion/contraction section 106 allows for the axial length of expansion compensator 100 to vary in response to an axial force (either compressive or tensile) applied by pipe end 10*a* and/or 10*b*. For example, if thermal expansion of one or both of the pipes 10 causes pipe ends 10*a,b* to attempt to move towards each other, the pipe ends will exert a compressive force along the longitudinal axis of expansion compensator 100. Such a compressive force may be exerted (or imposed) on expansion compensator 100 by a piping system in response to water having a temperature of from about 55° C. to about 85° C. flowing through the piping system. In response to such an applied force, expansion/contraction section 106 may contract in the axial direction, reducing the axial length of expansion compensator 100. The amount of contraction of expansion compensator 100 will depend on the amount of the applied compressive force, and the overall axial stiffness of expansion compensator 100. Also, if the axial stiffness of the elongate metal conduit is greater than the stiffness of the inner plastic liner, a greater portion of the applied compressive force will be borne (e.g. absorbed) by metal conduit 110 while expansion compensator 100 is compressed, and the stress on plastic liner 120 may accordingly be reduced.

As another example, if thermal contraction of one or both of the pipes 10 causes pipe ends 10*a,b* to attempt to move away from each other, the pipe ends may exert a tensile force along the longitudinal axis of expansion compensator 100. In response to such an applied force, expansion/contraction section 106 may expand in the axial direction, increasing the axial length of expansion compensator 100. Again, the amount of expansion of expansion compensator 100 will depend on the amount of the applied tensile force and the axial stiffness of expansion compensator 100. Also, if the axial stiffness of the elongate metal conduit is greater than the stiffness of the inner plastic liner, a greater portion of the applied tensile force will be borne by metal conduit 110 while expansion compensator 100 is expanded, and the stress on plastic liner 120 may accordingly be reduced.

It will be appreciated that the overall stiffness of expansion compensator 100 may be selected based on the forces expected to be imposed by a piping system into which it is installed, so as to reduce the stress in the piping system components. For example, an expansion compensator 100 with a relatively lower overall stiffness may compress or expand more easily in response to an applied force than an expansion compensator 100 with a relatively higher overall stiffness. Providing a more pliant expansion compensator 100 may allow greater axial deformation (e.g. expansion or contraction) of piping system components in response to expected thermal changes, which may reduce the internal stress in these components.

It will also be appreciated that the overall stiffness of expansion compensator 100 may be selected based on the expected operating conditions once the expansion compensator has been installed in a piping system (e.g. the expected compressive and tensile loads to be exerted (or imposed) on expansion compensator 100 due to thermal expansion or contraction of components of the piping system). However, expansion compensator 100 may also be subject to compressive and/or tensile loads during its installation in a piping system.

For example, the weight of portions of a piping system installed above an expansion compensator may partially or fully compress the expansion/contraction section of the expansion compensator during installation. Therefore, when a hot fluid flows through the piping system during use, the extent to which the expansion compensator may compress to absorb the expansion of the piping system due to heating by the hot fluid is limited since the expansion compensator was installed in a compressed state. A visual inspection of the installed piping system may not reveal that the expansion/contraction section is partially compressed.

Alternatively, or in addition, when coupling an end of expansion compensator 100 to the piping system using an insertion fit, an installer may not be aware of (or may not respect) a maximum design load for expansion compensator 100, and may apply higher forces to the expansion compensator. These higher forces may be applied intermittently (e.g. using a hammer or other striking tool) or continuously. The application of loads in excess of a maximum rated load may damage expansion compensator 100.

The possible damage to expansion compensator 100 by the imposition of excessive loads during installation may present a number of challenges. For example, the loads imposed on expansion compensator 100 during installation loads may be difficult (if not effectively impossible) to quantify in advance. Also, communicating the maximum design load of expansion compensator 100 to an installer may be challenging. Also, even if an installer is aware of the maximum design load, an installer may inadvertently—or intentionally—exceed the maximum design load during installation.

In particular, it may be challenging to install expansion compensator 100 in a vertical section of a piping system (e.g. a hot water riser of a residential or commercial building) without subjecting expansion compensator 100 to compressive axial loads in excess of a maximum rated load for expansion compensator 100.

As another challenge, damage to expansion compensator 100 during installation may not be apparent to a visual (or other) inspection of the installed expansion compensator 100. For example, the application of excessive installation loads may crack or otherwise damage inner plastic liner 120 without damaging metal conduit 110, and it may be impractical to inspect inner plastic liner 120—visually or otherwise—once expansion compensator 100 has been installed in a piping system.

FIGS. 1A to 2D exemplify methods and apparatus for installing expansion compensator 100. In order to prevent damage to expansion compensator 100 during installation and/or installation of an expansion compensator 100 in a compressed state, expansion compensator 100 may be provided with an installation guard prior to or during installation. Once the expansion compensator has been coupled to the piping system, the installation guard may be removed. In general, the method includes coupling an expansion compensator having at least one installation guard to a piping system, and once the expansion compensator is coupled to the piping system, adjusting the installation guard to permit axial compression of the expansion/contraction section during operation of the piping system. It will be appreciated that, in order to inhibit installation of an expansion compensator 100 in a compressed state, the guard may be installed after one end of expansion compensator 100 is connected to a piping system. However, it is preferred that the guard be applied prior to expansion compensator 100 being installed.

FIGS. 1A-C illustrate an expansion compensator 100 and an installation guard, referred to generally as 200, which may be used to inhibit axial compression of the expansion/contraction section during installation. It will be appreciated that, in variant embodiments, installation guard 200 may comprise more or fewer components.

As exemplified in FIG. 1A, installation guard 200 comprises first and second installation guard portions 210a,b positioned about (i.e. exterior to) expansion/contraction section 106 of expansion compensator 100. As shown in FIG. 1B, installation guard portions 210a,b may be dimensioned so that when installation guard is mounted to expansion compensator 100, a first end 202a,b of each installation guard portion 210a,b abuts connector 130a and a second end 204a,b of each installation guard portion 210a,b abuts connector 130b.

More specifically, a first end 202a of installation guard portion 210a abuts an inwardly facing surface 131a of connector 130a, and a second end 204a of installation guard portion 210a abuts an inwardly facing surface 131b of connector 130b. Similarly, a first end 202b of installation guard portion 210b abuts inwardly facing surface 131a of connector 130a, and a second end 204b of installation guard portion 210b abuts inwardly facing surface 131b of connector 130b.

In such an arrangement, an axial compressive load applied to first and second ends 102,104 of expansion compensator 100 may be partially, substantially, or preferably completely, borne by connectors 130a,b, and installation guard 200, rather than by expansion/contraction section 106. By bearing a partial, substantial, or complete portion of a compressive load applied to expansion compensator 100, installation guard 200 may inhibit (or prevent) axial compression or excessive axial compression of the expansion/contraction section 106 during installation.

In the embodiment illustrated in FIGS. 1A-1C, installation guard portions 210a,b are dimensioned such that when installation guard 200 is positioned about expansion compensator 100, longitudinal edges 206a,b of installation guard portions 210a,b are brought into abutment (or near abutment) with each other. It will be appreciated that other geometries may be used, such as interlocking tabs and recesses.

Installation guard 200 may be mounted to expansion compensator 100 using any suitable means. For example, as illustrated in FIG. 10, once installation guard portions 210a,b have been positioned about expansion compensator 100, they may be secured to each other and/or to expansion compensator 100 using tape 230. In such an embodiment, the installation guard portions 210a,b may be removed from expansion compensator 100 by removing, cutting, or otherwise compromising tape 230, and then removing installation guard portions 210a,b from expansion compensator 100. It will be appreciated that, alternatively or additionally, any suitable tape, adhesive, and/or mechanical coupling or fasteners, e.g., an adhesive applied to one or both installation guard portions 210a,b, one or more clamps, straps or the like applied around the exterior of gourd 200 or the like, may be used to mount installation guard 200 to expansion compensator 100.

In the exemplified embodiment of FIG. 1A, guard 200 overlies sleeve 140. However, it will be appreciated that installation guard 200 may be used to inhibit (or prevent) axial compression of an expansion compensator 100 that is not provided with sleeve 140. Alternatively, installation guard 200 may be configured to co-operate with sleeve 140 to inhibit (or prevent) axial compression during installation.

FIGS. 2A-2D exemplifies an expansion compensator 100 with an embodiment of an installation guard that co-operates with sleeve 140 during installation in a piping system. It will be appreciated that while expansion compensator 100 is shown in a somewhat horizontal orientation, installation guard 200 may be used to inhibit (or prevent) axial compression of an expansion compensator 100 installed in a vertical section of a piping system (e.g. a hot water riser of a residential or commercial building), or in any other orientation.

As exemplified in FIG. 2A, this installation guard comprises a first installation guard portion 220a positioned about (i.e. exterior to) expansion compensator 100 between connector 130a and sleeve 140, and a second installation guard portion 220b positioned about (i.e. exterior to) expansion compensator 100 between connector 130b and sleeve 140.

More specifically, a first end 222a of first installation guard portion 220a abuts inwardly-facing surface 131a of connector 130a, and a second end 224a of first installation guard portion 220a abuts end surface 146a of sleeve 140. Similarly, a first end 222b of second installation guard portion 220b abuts inwardly-facing surface 131b of connector 130b, and a second end 224b of second installation guard portion 220b abuts end surface 146b of sleeve 140. It will be appreciated that in variant embodiments of installation guard portions 220a,b, second ends 224a,b may alternatively, or additionally, abut one or more surfaces 148a,b, on tabs 144 of sleeve 140.

In such an arrangement, an axial compressive load applied to first and second ends 102,104 of expansion compensator 100 may be partially, substantially, or preferably completely borne by connectors 130a,b, installation guard portions 220a,b, and sleeve 140, rather than by expansion/contraction section 106. By bearing a partial, substantial, or complete portion of a compressive load applied to expansion compensator 100, installation guard portions 220a,b and sleeve 140 may inhibit (or prevent) axial compression, or excessive axial compression, of the expansion/contraction section 106 during installation.

Installation guard portions 220a,b may each comprise two or more separate portions (e.g. each may comprise a pair of semi-circular components, similar to installation guard portions 210a,b in FIGS. 1A-C).

Installation guard portions 220a,b may be mounted to expansion compensator 100 using any suitable means. For example, where installation guard portions 220a,b may each comprise two or more separate portions, once these separate portions have been positioned about expansion compensator 100, they may be secured to each other and/or to expansion compensator 100 using a tape, another adhesive, and/or using a mechanical coupling or fasteners discussed herein.

In such an embodiment, the installation guard portions 220a,b may be removed from expansion compensator 100 by removing, cutting, or otherwise compromising the securing means, and then removing installation guard portions 220a,b from expansion compensator 100.

It will be appreciated that any suitable geometry may be used for the installation guard. For example, installation guard 220 may comprise a unitary tubular body, and be mounted to expansion compensator 100 during manufacture of expansion compensator 100 (e.g. before connectors 130 are provided on the ends of expansion compensator 100). Installation guard 200 may comprise a single layer of material that is wrapped around (e.g. spirally wound around) expansion compensation 100 and secured in position, such as by gluing one end in overlapping relationship to another portion of the installation guard. Alternatively, installation guard may comprise one or more discrete longitudinally extending members that may be spaced around the expansion compensator.

In some embodiments, rather than being removed (either partially or completely), installation guard 200 may be configured so that it may be deformed to enable compression of the expansion/contraction section during use of the piping system. For example, material may be removed from installation guard 200 so that, while still in abutment with connectors 130 (and in the case of installation guard portions 220, in abutment with sleeve 140), the installation guard has an axial stiffness that is less than the axial stiffness of expansion/contraction section 106. Alternatively, or additionally, installation guard 200 may be deformed such that the ends of the installation guard portions are no longer in abutment with connectors 130 (and/or sleeve 140). If the installation guard is no longer in abutment with connectors 130, it may be inoperable to inhibit axial compression of the expansion/contraction section. For example, the installation guard portions may be telescopically configured or one or more layers may be removed from installation guard to weaken the installation guard and enable it to be compressed during use of the expansion compensator without significantly impacting the performance of the expansion compensator.

It will also be appreciated that expansion compensator 100 may itself expand or contract due to thermal expansion or contraction prior to its installation in a piping system. For example, expansion compensator 100 may be designed for installation at room temperature (e.g., 20° C.). For example, for a pipe installed at about 20° C. and used to convey hot water in a residential building (which is typically at a temperature of 70° C. to 83° C.), the degree of thermal expansion will be based on a temperature difference of approximately 50° C. to 63° C. An expansion compensator 100 may be designed to absorb the stresses expected on it due to such a degree of expansion (e.g., it may be designed to compress a sufficient amount to remove excessing compression due to such expansion of the piping system due to such a temperature differential).

However, if the same piping system is installed at about 0° C., the degree of thermal expansion due to conveying water at a temperature of 70° C. to 83° C. will be based on a temperature difference of approximately 70° C. to 83° C. This will impose a greater expansion stress on an expansion compensator 100. In addition, if an expansion compensator 100 is installed at say 0° C., then it will be appreciated that the expansion compensator will itself compress (it will have a shorter length at 0° C. than at room temperature). If the expansion compensator is allowed to thermally contract when installed in cold weather conditions, then the piping system will exert a first force on the expansion compensator when the piping system is exposed to room temperature (e.g., a house is completed and heated to room temperature). When the piping system is subsequently used to convey a heated fluid (e.g., residential hot water), then the piping system will exert a second force on the expansion compensator. This can be considered the design compression force or expansion stress for which the expansion compensator was designed. However, the degree to which the expansion compensator can compress to absorb the second force is limited by two factors. First, due to its installation in cold weather conditions, the expansion/contraction section may be partially compressed. Secondly, due to the first force, the expansion/compression section has already been compressed a particular amount. Therefore, the expansion/compression section may not be able to compress a sufficient amount to absorb a predetermined amount of the second force.

Accordingly, a thermal compression guard may be provided on expansion compensator 100. The thermal compression guard acts to inhibit and, preferably, prevent thermal contraction of all or a portion of expansion compensation 100 when expansion compensator 100 is installed in cold weather conditions. Accordingly, the thermal compression guard may be a member provided on expansion compensator 100 to limit contraction of all of a portion of the expansion/contraction section when it is exposed to temperatures below, e.g., room temperature (such as a temperature less than 20° C., less than 15° C., less than 10° C. or less than 5° C.).

In some embodiments, for example, the thermal compression guard may be a separate member from the installation guard. For example, the thermal compression guard may be a sleeve that inhibits or prevents all or a portion of expansion compensator 100, such as all or a portion of the expansion/contraction section, from contracting at low temperatures. An example may be a sleeve such as sleeve 140 that engages in grooves of the expansion/contraction section and inhibits or prevents the expansion/contraction section from contracting at low temperatures. The installation guard may be a sleeve (e.g., a sleeve formed from sleeve portions 210a,b) that is positioned interior or exterior to sleeve 140 so as to inhibit or prevent compression of all or a portion of expansion compensator 100, such as all or a portion of the expansion/contraction section, due to the weight of the piping system installed above the expansion compensation and imposed on the expansion compensator during installation.

In some embodiments, for example, the thermal compression guard may be the installation guard. Accordingly the same member may be designed to both inhibit or prevent all or a portion of expansion compensator 100, such as all or a portion of the expansion/contraction section, contracting due the thermal contraction and loads imposed by the piping system during installation.

It will be appreciated that installation guard 200 may be mounted to expansion compensator 100 during manufacture of expansion compensator 100, before delivering expansion compensator 100 to a site where it will be installed to a piping system, or at the site but before coupling expansion compensator 100 to the piping system.

Preferably, installation guard 200 (and/or sleeve 140) has a lower coefficient of thermal expansion than expansion compensator 100, when measured along the longitudinal axis. Also, installation guard 200 is preferably mounted to the expansion compensator when the expansion compensator is at a predetermined temperature (e.g. at about 20° C.).

Thus, when the expansion compensator and installation guard are subsequently cooled, installation guard 200 may inhibit (or prevent) axial compression or excessive axial compression of the expansion/contraction section 106 due to thermal contraction. In this way, installation guard 200 inhibits or prevents expansion compensator 100 from being installed in a compressed or partially compressed state, regardless of the temperature at which it is installed.

For example, installation guard 200 may be made from a material that has a low coefficient of thermal expansion relative to the coefficient of thermal expansion of inner plastic liner 120, metal conduit 110, and/or the overall coefficient of thermal expansion of expansion/contraction section 106. Alternatively, or additionally, the geometry of installation guard 200 may be selected to limit the amount of axial contraction due to cooling.

Preferably, installation guard 200 is made from a relatively low cost material that can provide an installation guard 200 with sufficient stiffness and/or rigidity, such as cellulose or one or more other suitable biodegradable materials, although it will be appreciated that other materials may be used. For example, installation guard may be made for cardboard, corrugated cardboard, plastic or metal.

Returning to FIG. 2A, expansion compensator 100—with installation guard portions 220a,b mounted to expansion compensator—is shown disposed between and aligned with pipe ends 10a,b. More specifically, connector 130a is aligned with pipe end 10a, and connector 130b is aligned with pipe end 10b. In the illustrated embodiment, connectors 130a,b are dimensioned to receive therein, respectively, pipe ends 10a,b. FIG. 2B shows expansion compensator 100 once it has been coupled to pipe ends 10a,b. It will be appreciated that the ends of connectors 130a,b may be configured to be connected to a pipe end 10a,b by any means known in the piping arts.

During the coupling of expansion compensator 100 to pipe ends 10a,b, installation guard portions 220a,b and sleeve 140 cooperate to inhibit or prevent a compressive load applied to first and/or second ends 102,104 of expansion compensator 100 (e.g. to connectors 130a,b from the weight of the piping system above expansion compensator 100) from being borne by expansion/contraction section 106. For the embodiment of installation guard 200 shown in FIGS. 1A-1C, installation guard portions 210a,b inhibit or prevent a compressive load applied to first and second ends 102,104 of expansion compensator 100 from being borne by expansion/contraction section 106.

It will be appreciated that while the example embodiments of installation guard 200 illustrated in FIGS. 1B and 2A are operable to inhibit axial compression of the expansion/contraction section through abutment with connectors 130a,b, this need not be the case. For example, one or more flanges or other surface features may be provided on outer surface 112 of metal conduit 110 on one or both sides of an expansion/contraction section of expansion compensator 100 (e.g. between connector 130 and expansion/contraction section 106), and an installation guard may be configured to abut or otherwise engage with these flanges or surface features and/or connectors 130 to inhibit axial compression of the expansion/contraction section.

Alternatively, or additionally, an installation guard may be configured to abut or engage with one or both of the last ridges of expansion/contraction section 106 (i.e. the ridges closest to the connectors) to inhibit axial compression of the expansion/contraction section.

If the axial stiffness of the installation guard is greater than the stiffness of the unguarded expansion compensator (i.e. the stiffness of expansion/contraction section 106), a greater portion (preferably a substantial portion, and most preferably all or substantially all) of an axial force applied to expansion compensator 100 will be borne (e.g. absorbed) by the installation guard, while expansion/contraction section 106 will bear a smaller portion (preferably a significantly smaller portion and more preferably none) of the applied axial force. It will also be appreciated that if the axial stiffness is of the installation guard is sufficient to resist a force greater than the expected compressive force to be applied during installation without significant axial displacement (i.e. compression), then expansion/contraction section 106 will not be compressed during installation. In this way, installation guard 200 inhibits axial compression of the expansion/contraction section, which may prevent damage to expansion compensator 100 during installation.

FIG. 2C shows expansion compensator 100 once it has been coupled to pipe ends 10*a,b* and the installation guard has been removed. Without the installation guard portions 210*a,b*, expansion/contraction section 106 allows for the axial length of expansion compensator 100 to vary in response to an axial force (either compressive or tensile) applied by pipe end 10*a* and/or 10*b*, as discussed above with reference to FIG. 2D.

It will be appreciated that, in some embodiments, which may be used by itself or with any other embodiment disclosed herein, an expansion compensator which has a greater ability to contract and absorb compressive forces may be desired. One option is to provide an expansion compensator with a longer expansion/contraction section and/or a greater spacing may be provided between the ridges of the expansion/contraction section. Alternately or in addition, the expansion compensator may be pre-tensioned. For example, prior to the installation of an installation guard and/or a thermal compression guard, the expansion compensator may be stretched. For example, each end of the expansion compensator may be secured in a clamp and pulled outwardly so as to stretch the expansion/contraction section. Once the expansion/contraction section has been stretched, the installation guard and/or a thermal compression guard may be installed so as to maintain the expansion/contraction section in a stretched condition. An advantage of this embodiment is that the expansion compensator may contract a greater amount when a compressive load is applied due to the thermal expansion of pipes attached thereto. This embodiment may be used when, for example, an expansion compensator is to be installed between longer runs of pipe (e.g., the height in the floor of a building may be 12-20 feet or more).

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An expansion compensator and an installation guard, the expansion compensator connectable in a piping system:
   (a) the expansion compensator comprising:
      (i) an elongate conduit having first and second longitudinally spaced apart ends, an inner surface, an outer surface, a longitudinally extending expansion/contraction section and an interior volume extending from the first end to the second end;
      (ii) a first connector provided at the first end of the elongate conduit, the first connector having an opening in fluid communication with the interior volume;
      (iii) a first inwardly facing surface spaced laterally outwardly from a lateral outer extent of the expansion/contraction section and facing longitudinally inwardly towards the second end;
      (iv) a second connector provided at the second end of the elongate conduit, the second connector having an opening in fluid communication with the interior volume; and
      (v) a second inwardly facing surface spaced laterally outwardly from a lateral outer extent of the expansion/contraction section and facing longitudinally inwardly towards the first end;
      and,
   (b) the installation guard positionable around an exterior of the expansion/contraction section, the installation guard comprising a first end and a longitudinally spaced apart second end wherein, when installed, the first end of the installation guard is positioned to abut the first inwardly facing surface of the first connector and the second axially spaced apart end of the installation guard is positioned to abut the second inwardly facing surface of the second connector whereby when installed, the installation guard inhibits longitudinal compression of the expansion/contraction section during installation while permitting longitudinal expansion of the expansion/contraction section when the installation guard is installed on the expansion compensator, wherein the installation guard comprises at least two axially extending elongate members which combined circumferentially extend around the expansion compensator while each elongate member individually circumferentially extends only part way around the expansion compensator.

2. The expansion compensator and the installation guard of claim 1, wherein the installation guard is removably mounted to the expansion compensator.

3. The expansion compensator and the installation guard of claim 1, wherein the installation guard is configured to be deformed following installation to enable compression of the expansion/contraction section during use of the piping system.

4. The expansion compensator and the installation guard of claim 3, wherein at least one of the at least two elongate members is removable from the expansion/contraction section.

5. The expansion compensator and the installation guard of claim 4, wherein the at least two elongate members are discrete installation guard portions.

6. The expansion compensator and the installation guard of claim 5, wherein the at least two elongate members are removably secured to each other.

7. The expansion compensator and the installation guard of claim 6, wherein the at least two elongate members are removably secured to each other using tape.

8. The expansion compensator and the installation guard of claim 1, wherein the installation guard is made of cellulose.

9. The expansion compensator and the installation guard of to claim 1, wherein the expansion/contraction section has a first coefficient of thermal expansion along a longitudinal axis, the installation guard has a second, lower coefficient of thermal expansion along the longitudinal axis and the installation guard is operable to inhibit axial compression of the expansion/contraction section due to thermal contraction of the expansion compensator.

10. The expansion compensator and the installation guard of claim 9, wherein the installation guard also comprises a thermal compression guard.

11. The expansion compensator and the installation guard of claim 1, wherein a single first inwardly facing surface and a single second inwardly facing surface are provided whereby, when the installation guard is installed, the expansion/contraction section is inhibited from inward compression from only a single position.

\* \* \* \* \*